US009995970B2

(12) United States Patent
Monma et al.

(10) Patent No.: US 9,995,970 B2
(45) Date of Patent: Jun. 12, 2018

(54) MANUFACTURING METHOD OF A LIQUID CRYSTAL DEVICE COMPRISING AN ALIGNMENT FILM FORMED UNDER REDUCED PRESSURE

(71) Applicant: Semiconductor Energy Laboratory Co., Ltd., Kanagawa-ken (JP)

(72) Inventors: Yohei Monma, Tochigi (JP); Hiroki Adachi, Tochigi (JP); Shingo Eguchi, Tochigi (JP); Saki Obana, Tochigi (JP); Koji Moriya, Kanagawa (JP); Shuji Fukai, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days. days.

(21) Appl. No.: 15/661,602

(22) Filed: Jul. 27, 2017

(65) Prior Publication Data

US 2017/0322437 A1 Nov. 9, 2017

Related U.S. Application Data

(62) Division of application No. 13/207,766, filed on Aug. 11, 2011.

(30) Foreign Application Priority Data

Aug. 17, 2010 (JP) ................................ 2010-182078

(51) Int. Cl.
*G02F 1/1339* (2006.01)
*G02F 1/1345* (2006.01)

(52) U.S. Cl.
CPC .......... *G02F 1/1339* (2013.01); *G02F 1/1345* (2013.01)

(58) Field of Classification Search
CPC .... G02F 1/1337; G02F 1/1341; G02F 1/1345; G02F 1/133351
See application file for complete search history.

(56) References Cited

U.S. PATENT DOCUMENTS 5,621,553 A * 4/1997 Nishiguchi ....... G02F 1/133377 349/153
6,238,754 B1 5/2001 Shohara et al.
(Continued)

FOREIGN PATENT DOCUMENTS

EP 2 273 476 A1 1/2011
EP 2 363 383 A1 9/2011
(Continued)

OTHER PUBLICATIONS

Korean Office Action re Application No. KR 2011-0081112, dated Aug. 29, 2017.

*Primary Examiner* — Paul Lee
(74) *Attorney, Agent, or Firm* — Husch Blackwell LLP

(57) ABSTRACT

The object can be achieved by the following structure. A material whose value of fracture toughness is greater than or equal to 1.5 [$MPa \cdot m^{1/2}$] is used for a base substrate and a counter substrate which hold a liquid crystal material therebetween; a first sealant containing liquid crystal contaminants at less than or equal to $1\times10^{-4}$ wt % is provided so as be in contact with the liquid crystal material and to surround the liquid crystal material seamlessly; the second sealant is provided to surround the first sealant; and the base substrate and the counter substrate which hold the liquid crystal material therebetween using the first sealant and the second sealant are bonded with a bond strength of greater than or equal to 1 [$N/mm^2$].

9 Claims, 11 Drawing Sheets

(56) References Cited

U.S. PATENT DOCUMENTS

| | | | | |
|---|---|---|---|---|
| 7,405,432 | B2 | 7/2008 | Adachi | |
| 7,426,008 | B2 | 9/2008 | Yamazaki et al. | |
| 7,675,603 | B2 | 3/2010 | Miyashita et al. | |
| 7,820,495 | B2 | 10/2010 | Dairiki et al. | |
| 7,940,360 | B2 | 5/2011 | Ishitani | |
| 8,297,991 | B2 | 10/2012 | Adachi | |
| 8,361,845 | B2 | 1/2013 | Dairiki et al. | |
| 8,395,740 | B2 | 3/2013 | Kubota et al. | |
| 8,476,665 | B2 | 7/2013 | Adachi | |
| 8,634,050 | B2 | 1/2014 | Yamazaki et al. | |
| 9,434,642 | B2 | 9/2016 | Garner et al. | |
| 2004/0233374 | A1* | 11/2004 | Yamazaki | G02F 1/1341 349/153 |
| 2006/0077334 | A1 | 4/2006 | Kim et al. | |
| 2006/0215103 | A1* | 9/2006 | Miyashita | G02F 1/1341 349/153 |
| 2007/0116899 | A1 | 5/2007 | Tyan et al. | |
| 2008/0292856 | A1 | 11/2008 | Garner et al. | |
| 2009/0131550 | A1 | 5/2009 | Arai et al. | |
| 2009/0147205 | A1* | 6/2009 | Mizuno | G02F 1/1339 349/153 |
| 2010/0073615 | A1 | 3/2010 | Yaguchi et al. | |
| 2010/0103362 | A1* | 4/2010 | Byun | G02F 1/1339 349/153 |
| 2010/0118236 | A1 | 5/2010 | Kim et al. | |
| 2010/0231840 | A1 | 9/2010 | Saida et al. | |
| 2011/0086937 | A1 | 4/2011 | Son et al. | |
| 2011/0114160 | A1 | 5/2011 | Murashige et al. | |
| 2011/0244225 | A1 | 10/2011 | Hattori et al. | |
| 2013/0286372 | A1 | 10/2013 | Adachi | |
| 2014/0132908 | A1 | 5/2014 | Yamazaki et al. | |
| 2016/0351837 | A1 | 12/2016 | Garner et al. | |

FOREIGN PATENT DOCUMENTS

| | | | |
|---|---|---|---|
| EP | 3 156 380 | A1 | 4/2017 |
| JP | 04-131827 | A | 5/1992 |
| JP | 05-265012 | A | 10/1993 |
| JP | 10-177187 | A | 6/1998 |
| JP | 11-064862 | A | 3/1999 |
| JP | 2000-019540 | A | 1/2000 |
| JP | 2000-039609 | A | 2/2000 |
| JP | 2004-295109 | A | 10/2004 |
| JP | 2005-234130 | A | 9/2005 |
| JP | 2006-258971 | A | 9/2006 |
| JP | 2006-267532 | A | 10/2006 |
| JP | 2007-043121 | A | 2/2007 |
| JP | 2008-090330 | A | 4/2008 |
| JP | 2008-159935 | A | 7/2008 |
| JP | 2009-003020 | A | 1/2009 |
| JP | 2010-072529 | A | 4/2010 |
| JP | 2010-096889 | A | 4/2010 |
| KR | 2006-0103845 | A | 10/2006 |
| KR | 2009-0098648 | A | 9/2009 |
| KR | 2010-0017824 | A | 2/2010 |
| KR | 2010-0088535 | A | 8/2010 |
| WO | WO 2007/144995 | A1 | 12/2007 |
| WO | WO 2008/153672 | A1 | 12/2008 |
| WO | WO 2010/053092 | A1 | 5/2010 |

* cited by examiner

MANUFACTURING METHOD OF A LIQUID CRYSTAL DEVICE COMPRISING AN ALIGNMENT FILM FORMED UNDER REDUCED PRESSURE

This application is a divisional of copending U.S. application Ser. No. 13/207,766, filed on Aug. 11, 2011 which is incorporated herein by reference.

BACKGROUND OF THE INVENTION

1. Field of the Invention

The present invention relates to a liquid crystal display device and a manufacturing method thereof.

2. Description of the Related Art

In recent years, liquid crystal devices in which light transmittance is adjusted by controlling alignment of liquid crystal materials with voltage applied to the liquid crystal materials have been developed. For example, liquid crystal displays, dimming glass, and the like are commercially available. Specifically, in image display devices, liquid crystal displays have a large market share because various kinds of performance such as higher productivity, lower cost, higher display quality, and higher reliability are provided in a balanced manner.

The needs for reduction in thickness and weight have been highly increasing. For example, a substrate (a glass substrate is mainly used) for sealing a liquid crystal material is made to be thin by a technique such as mechanical polishing or chemical polishing.

However, there is a limit to reduction in thickness of a substrate by a technique such as mechanical polishing, or chemical polishing. Further, there is a problem in that strength of a substrate is reduced as the substrate is made to be thinner and that a liquid crystal device is prone to fracture due to an impact from the outside. Techniques disclosed in Patent Document 1 have been studied for a liquid crystal device which is thin, lightweight, and is less prone to fracture even in the case where force is applied from the outside, for example, an impact is made or bending is made.

REFERENCE

Patent Document

Patent Document 1: Japanese Published Patent Application No. 2007-043121

SUMMARY OF THE INVENTION

The present invention is made in view of the above technical background. Thus, it is an object to provide a liquid crystal device which is less prone to fracture even in the case where strong force is applied to the liquid crystal from the outside.

Further, it is an object to provide a method for manufacturing the liquid crystal device with high yield.

In order to achieve the above objects, the present invention focuses on toughness of a substrate, impurities in a sealant, a bond strength between the substrate and the sealant, and a structure of the sealant.

A material with high toughness may be used for two substrates which face each other with a liquid crystal material provided therebetween in order to manufacture a liquid crystal device which is less prone to fracture. Note that the two substrates are referred to as a base substrate and a counter substrate in the following description. The base substrate includes a substrate (hereinafter referred to as a first substrate) with high toughness, which is one of a pair of substrates used for sandwiching the liquid crystal material between the substrates. The counter substrate includes a substrate (hereinafter referred to as a second substrate) with high toughness, which is the other of the pair of substrates used for sandwiching the liquid crystal material between the substrates.

Toughness represents the resistance of a material to fracture. The fracture is less prone to progress even in the case where strong force is applied from the outside as a material has higher toughness, and the fracture is less prone to progress when a flaw produced in part of a substrate acts as a starting point. The level of the toughness can be expressed in the value of fracture toughness Kc. Note that the fracture toughness Kc can be determined by a test method defined in JIS R1607.

In order to increase resistance to stress such as an impact and bending, a material provided with high toughness, whose value of fracture toughness is greater than or equal to 1.5 [$MPa\cdot m^{1/2}$], may be used. Using the material with high toughness, resistance of a liquid crystal device to strong force from the outside can be increased. A phenomenon in which a substrate is damaged can be prevented even in the case where a liquid crystal device is dropped and is strongly shocked, for example.

However, as the semiconductor device is less prone to fracture with the use of the material with high toughness for the base substrate and the counter substrate, strong force is applied to a bonding portion of a sealant and the substrates. Thus, stronger adhesive force than that of a conventional sealant is needed. It is necessary that the base substrate be bonded to the counter substrate with a bond strength of greater than or equal to 1 [$N/mm^2$].

Note that the adhesive force of the sealant can be increased by adding various kinds of sealants and an additive material.

Further, besides the function of bonding the base substrate and the counter substrate, the sealant is required to seal the liquid crystal material. The sealant which seals the liquid crystal material surrounds the liquid crystal material so as to prevent the liquid crystal material from leaking. Accordingly, the sealant is provided so as to be in contact with the liquid crystal material. Thus, impurities (hereinafter referred to as liquid crystal contaminants) that adversely affect a liquid crystal material are suppressed in a conventional sealant so as to prevent elution of the component of the sealant in the liquid crystal material and contamination of the liquid crystal material.

As a sealant containing liquid crystal contaminants, a photo-cationic curable adhesive can be given, for example. The photo-cationic curable adhesive has advantages in production, such as no need for heating at high temperature in cure treatment and short cure treatment time, and has strong adhesive force. Meanwhile, mixing of cationic components generated in accordance with the cure treatment into the liquid crystal material gives adverse effects such as alignment disorder of liquid crystal materials; thus, the photo-cationic curable sealant is not suitable for a sealant which seals the liquid crystal material.

As described above, when a material with high toughness is used for the base substrate and the counter substrate, the sealant needs to meet two requirements of strong adhesive force to a substrate and low contamination. However, a material with strong adhesive force contains a variety of additive materials including liquid crystal contaminants; thus, meeting the two requirements is extremely difficult.

Thus, in order to meet the two requirements, the base substrate is bonded to the counter substrate with a liquid crystal material provided therebetween using a first sealant which is selected in consideration of liquid crystal contaminants and a second sealant which is selected without consideration of liquid crystal contaminants. Specifically, the base substrate whose value of fracture toughness is greater than or equal to 1.5 [MPa·$m^{1/2}$] is bonded to the counter substrate using the first sealant and the second sealant in the following manner. The first sealant which contains liquid crystal contaminants at less than or equal to $1\times10^{-4}$ wt % and seals the liquid crystal material is provided so as to be in contact with the liquid crystal material and to surround the liquid crystal material seamlessly, and the second sealant is provided so as to surround the first sealant.

Accordingly, the first sealant in which liquid crystal contaminants are reduced prevents the liquid crystal material from being in direct contact with the second sealant; thus, the second sealant can be selected from a variety of materials without consideration of the liquid crystal contaminants. Note that the first sealant may have a function of bonding the base substrate and the counter substrate in addition to a function of suppressing seepage of liquid crystal contaminants.

Further, the second sealant is formed so as to surround the first sealant, and the base substrate can be bonded to the counter substrate using both of the sealants with a bond strength of greater than or equal to 1 [N/$mm^2$].

With such a structure, a liquid crystal device in which the base substrate is not separated from the counter substrate even in the case where strong force is applied to the liquid crystal device from the outside, which is less prone to fracture, can be provided.

In other wards, one embodiment of the present invention is a liquid crystal device which includes a liquid crystal material, a first sealant being in contact with the liquid crystal material and surrounding the liquid crystal material seamlessly, a second sealant surrounding the first sealant, and a base substrate and a counter substrate whose value of fracture toughness is greater than or equal to 1.5 [MPa·$m^{1/2}$]. In the liquid crystal device, the base substrate is bonded to the counter substrate with a bond strength of greater than or equal to 1 [N/$mm^2$] using the first sealant and the second sealant; the liquid crystal material is provided between the base substrate and the counter substrate while being in contact with the first sealant; the first sealant contains a liquid crystal contaminant at less than or equal to $1\times10^{-4}$ wt %; the base substrate includes a first substrate, an element layer provided over the first substrate, and a first alignment film provided over the element layer and being in contact with the liquid crystal material; the counter substrate includes a second substrate, an electrode film provided over the second substrate, and a second alignment film provided on the electrode film and being in contact with the liquid crystal material; and part of the element layer is electrically connected to part of the electrode film through a conductive material.

According to the above embodiment of the present invention, alignment of the liquid crystal material can be adjusted by applying voltage to the element layer formed on the base substrate and the electrode film formed on the counter substrate or stopping application of voltage. The liquid crystal device with high display quality, which is less prone to fracture even in the case where strong force is applied to the liquid crystal device from the outside, can be provided.

Further, one embodiment of the present invention is a liquid crystal device in which a base substrate is provided with a first substrate and an element layer which is formed over the first substrate and is in contact with a liquid crystal material; a counter substrate is provided with a second substrate and an electrode film which is formed on the second substrate and is in contact with the liquid crystal material; the liquid crystal material is a liquid crystal material exhibiting a blue phase; and part of the element layer and part of the electrode film are electrically connected to each other through a conductive material.

According to the above embodiment of the present invention, alignment of the liquid crystal can be adjusted without providing an alignment film by applying voltage to the element layer formed on the base substrate and the electrode film formed on the counter substrate or stopping application of voltage. Further, there is no viewing angle dependence in principle, and display corresponding to a very high-speed response of less than or equal to 1 ms can be achieved. Thus, the liquid crystal device with high-speed response characteristics and improved viewing angle characteristics, which is less prone to fracture even in the case where strong force is applied to the liquid crystal device from the outside, can be provided.

Further, one embodiment of the present invention is a liquid crystal device in which a base substrate includes a first substrate, a first electrode film which is formed over the first substrate, and a first alignment film which is formed over the first electrode film and is in contact with a liquid crystal material; a counter substrate includes a second substrate, a second electrode film which is formed on the second substrate, and a second alignment film which is formed on the second electrode film and is in contact with the liquid crystal material; and part of the first electrode film is electrically connected to part of the second electrode film through a conductive material.

According to the above embodiment of the present invention, alignment of the liquid crystal can be adjusted without providing an element layer over the base substrate by applying voltage to the first electrode film formed over the base substrate and the second electrode film formed on the counter substrate or by stopping application of voltage, whereby light transmittance of the liquid crystal device can be adjusted. Thus, an inexpensive liquid crystal device with a simple structure, which is less prone to fracture even in the case where strong force is applied to the liquid crystal device from the outside, can be provided.

Further, one embodiment of the present invention is a liquid crystal device in which a first sealant and a second sealant are photo-curable materials.

According to the above embodiment of the present invention, the first sealant and the second sealant are cured without being subjected to heat treatment, whereby the first substrate can be bonded to the second substrate. Thus, it is possible to provide the liquid crystal device in which adverse effects of shrinkage, deformation, and the like due to heat on the first substrate and the second substrate are suppressed.

Further, one embodiment of the present invention is a liquid crystal device which includes a third sealant provided so as to seamlessly surround a second sealant whose viscosity is less than or equal to 1000 cP.

According to the above embodiment of the present invention, leakage of the second sealant from end faces of the substrates can be prevented when the base substrate is bonded to the counter substrate. Thus, a shortage of the second sealant which is necessary for the base substrate and the counter substrate to be bonded to each other can be prevented. Thus, the highly-reliable liquid crystal device in which the first substrate is firmly bonded to the second substrate with a bond strength of greater than or equal to 1 [N/mm$^2$] can be provided.

Further, one embodiment of the present invention is a method for manufacturing a liquid crystal device which includes a step of forming an element layer over a top surface of a first substrate, providing a first temporary fixing substrate over a bottom surface of the first substrate with a slightly adhesive material provided therebetween, forming a first alignment film on the element layer, and performing alignment treatment on the first alignment film, whereby a base substrate to which the first temporary fixing substrate is bonded is formed, and a step of forming a conductive film on a top surface of a second substrate, providing a second temporary fixing substrate over a bottom surface of the second substrate with a slightly adhesive material provided therebetween, forming a second alignment film on the conductive film, and performing alignment treatment on the second alignment film, whereby a counter substrate to which the second temporary fixing substrate is bonded is formed. The above steps are performed in no particular order. The method for manufacturing the liquid crystal device further includes a step of providing, over the base substrate, a liquid crystal material, a first sealant surrounding the liquid crystal material, and a second sealant surrounding the first sealant, providing a first conductive material over the element layer, bonding a surface where the second alignment film in the counter substrate is formed to a surface where the first alignment film in the base substrate is formed under reduced pressure, and performing cure treatment on the first sealant, the second sealant, and the first conductive material, whereby the base substrate is bonded to the counter substrate using the first sealant and the second sealant, part of the element layer is electrically connected to part of an electrode film using the first conductive material, and then the slightly adhesive material and the first temporary fixing substrate are separated from the base substrate, and a step of separating the slightly adhesive material and the second temporary fixing substrate from the counter substrate. The above steps are performed in no particular order, and an external connection terminal is connected to part of the element layer with a second conductive material provided therebetween.

According to the above embodiment of the present invention, when a liquid crystal device with high display quality is manufactured, the first temporary fixing substrate is provided for the first substrate with the slightly adhesive material provided therebetween and the second temporary fixing substrate is provided for the second substrate with the slightly adhesive material provided therebetween. Thus, deformation or fracture of the first substrate and the second substrate due to force applied at the time of manufacturing the liquid crystal device can be suppressed. Further, deformation or fracture can be suppressed with the use of the temporary fixing substrates even in the case where the first substrate and the second substrates have flexibility. Thus, a general manufacturing apparatus used for manufacturing a liquid crystal device using a glass substrate can be used without any change. Therefore, the liquid crystal device with high display quality can be formed with high yield.

Further, one embodiment of the present invention is a method for manufacturing a liquid crystal device which includes a step of forming an element layer over a top surface of a first substrate and providing a first temporary fixing substrate over a bottom surface of the first substrate with a slightly adhesive material provided therebetween, whereby a base substrate to which the first temporary fixing substrate is bonded is formed, and a step of forming an electrode film over a top surface of a second substrate and providing a second temporary fixing substrate over a bottom surface of the second substrate with the slightly adhesive material provided therebetween, whereby a counter substrate to which the second temporary fixing substrate is bonded is formed. The above steps are performed in no particular order. The method for manufacturing the liquid crystal device further includes a step of providing, over the base substrate, a liquid crystal material exhibiting a blue phase, a first sealant surrounding the liquid crystal material, and a second sealant surrounding the first sealant, providing a first conductive material over the element layer, bonding a surface where the electrode film in the counter substrate is formed to a surface where the element layer in the base substrate is formed under reduced pressure, and performing cure treatment on the first sealant, the second sealant, and the first conductive material, whereby the base substrate is bonded to the counter substrate using the first sealant and the second sealant, part of the element layer is electrically connected to part of the electrode film using the first conductive material, and then the slightly adhesive material and the second temporary fixing substrate are separated from the base substrate, and a step of separating the slightly adhesive material and the second temporary fixing substrate from the counter substrate. The above steps are performed in no particular order, and an external connection terminal is connected to part of the element layer with the second conductive material provided therebetween.

According to the above embodiment of the present invention, when a high-performance liquid crystal device with a wide viewing angle and high-speed response is manufactured, the first temporary fixing substrate is provided for the base substrate with the slightly adhesive material provided therebetween and the second temporary fixing substrate is provided for the counter substrate with the slightly adhesive material provided therebetween. Thus, deformation or fracture of the base substrate and the counter substrate due to force applied at the time of manufacturing the liquid crystal device can be suppressed. Further, deformation or fracture can be suppressed with the use of the temporary fixing substrates even in the case where substrates with high toughness which are used for the base substrate and the counter substrate have flexibility. Thus, a general manufacturing apparatus used for manufacturing a liquid crystal device using a glass substrate can be used without any change. Therefore, the high-performance liquid crystal device with a wide viewing angle and high-speed response can be formed with high yield.

Further, one embodiment of the present invention is a method for manufacturing a liquid crystal device which includes a step of forming a first electrode film on a top surface of a first substrate, providing a first temporary fixing substrate over a bottom surface of the first substrate with a slightly adhesive material provided therebetween, forming a first alignment film over the first electrode film, and performing first alignment treatment on the first alignment film, whereby a base substrate to which the first temporary fixing substrate is bonded is formed, and a step of forming a second electrode film on a top surface of a second substrate, providing a second temporary fixing substrate over a bottom surface of the second substrate with a slightly adhesive material provided therebetween, forming a second alignment film over the second electrode film, and performing second alignment treatment on the second alignment film, whereby a counter substrate to which the second temporary fixing substrate is bonded is formed. The above steps are performed in no particular order. The method for manufacturing the liquid crystal device further includes a step of providing, over the base substrate, a liquid crystal material, a first sealant surrounding the liquid crystal material, a second sealant surrounding the first sealant, and a first conductive material on the first electrode, bonding a surface where the second alignment film in the counter substrate is formed to a surface where the first alignment film in the base substrate is formed under reduced pressure, and performing cure treatment on the first sealant, the second sealant, and the first conductive material, whereby the base substrate is bonded to the counter substrate using the first sealant, and the second sealant, part of the first electrode film is electrically connected to part of the second electrode film using the first conductive material, and then the slightly adhesive material and the first temporary fixing substrate are separated from the base substrate, and a step of separating the slightly adhesive material and the second temporary fixing substrate from the counter substrate. The above steps are performed in no particular order, and an external connection terminal is connected to part of the element layer with the second conductive material interposed therebetween.

According to the above embodiment of the present invention, when the liquid crystal device having a simple structure in which the element layer is not formed is manufactured, the first temporary fixing substrate is provided for the base substrate with the slightly adhesive material provided therebetween and the second temporary fixing substrate is provided for the counter substrate with the slightly adhesive material provided therebetween. Thus, deformation or fracture of the base substrate and the counter substrate due to force applied in manufacturing the liquid crystal device can be suppressed. Further, deformation or fracture can be suppressed with the use of the temporary fixing substrates in the case where substrates having high toughness which are used for the base substrate and the counter substrate have flexibility. Thus, a general manufacturing apparatus used for manufacturing a liquid crystal device using a glass substrate can be used without any change. Therefore, the liquid crystal device having a simple structure in which an element layer is not formed can be formed with high yield.

Note that when "B is formed on A" or "B is formed over A" is explicitly described in this specification, it does not necessarily mean that B is formed in direct contact with A. The expression includes the case where A and B are not in direct contact with each other, i.e., the case where another object is provided between A and B. Here, each of A and B corresponds to an object (e.g., a device, an element, a circuit, a wiring, an electrode, a terminal, a film, a layer, or a substrate).

Therefore, for example, when it is explicitly described that a layer B is formed on or over a layer A, it includes both the case where the layer B is formed in direct contact with the layer A, and the case where another layer (e.g., a layer C or a layer D) is formed in direct contact with the layer A and the layer B is formed in direct contact with the another layer. Note that another layer (e.g., a layer C or a layer D) may be a single layer or a plurality of layers.

Note that the term "liquid crystal device" generally refers to a device which includes a liquid crystal material. The liquid crystal device includes, for example, not only a device which displays images, such as a liquid crystal display, but also a glass in which a liquid crystal material adjusting the transmission state of light is sealed.

According to the present invention, a high-performance and inexpensive liquid crystal device in which the base substrate is not separated from the counter substrate even in the case where strong force is locally applied to the liquid crystal device and contamination of a liquid crystal material due to liquid crystal contaminants is suppressed can be provided.

DETAILED DESCRIPTION OF THE INVENTION

Figure 1A:
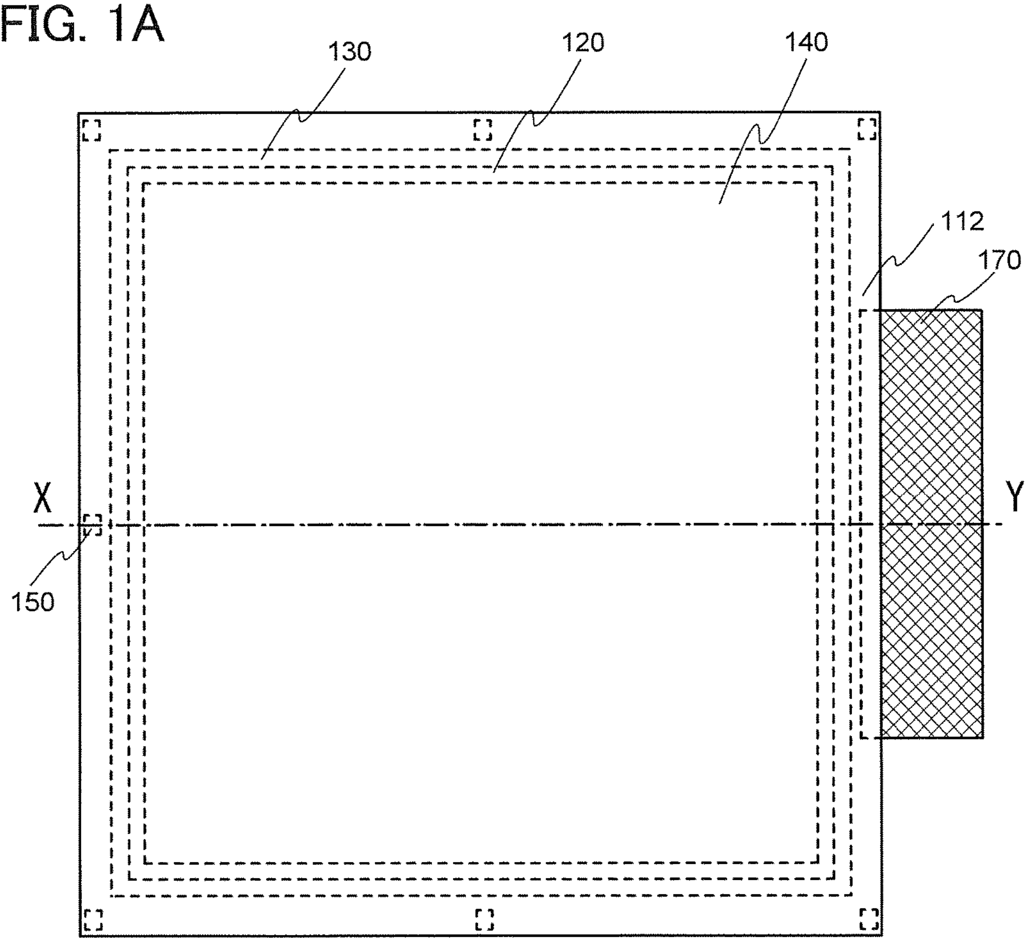
FIGS. 1A and 1B illustrate a top structure and a cross-sectional structure of a liquid crystal device according to an embodiment.

Embodiments will be described in detail with reference to the drawings. Note that the invention is not limited to the following description, and it will be easily understood by those skilled in the art that various changes and modifications can be made without departing from the spirit and scope of the invention. Therefore, the invention should not be construed as being limited to the description in the following embodiments. Note that in the structures of the invention described below, the same portions or portions having similar functions are denoted by the same reference numerals in different drawings, and description of such portions is not repeated.

Embodiment 1

In this embodiment, a structure and a manufacturing method of a liquid crystal device according to one embodiment of the disclosed invention will be described with reference to FIGS. 1A and 1B, FIGS. 2A to 2E, and FIGS. 3A to 3C, FIGS. 4A and 4B, and FIGS. 5A and 5B.

<Example of General Structure of Liquid Crystal Device>

Figure 1B:
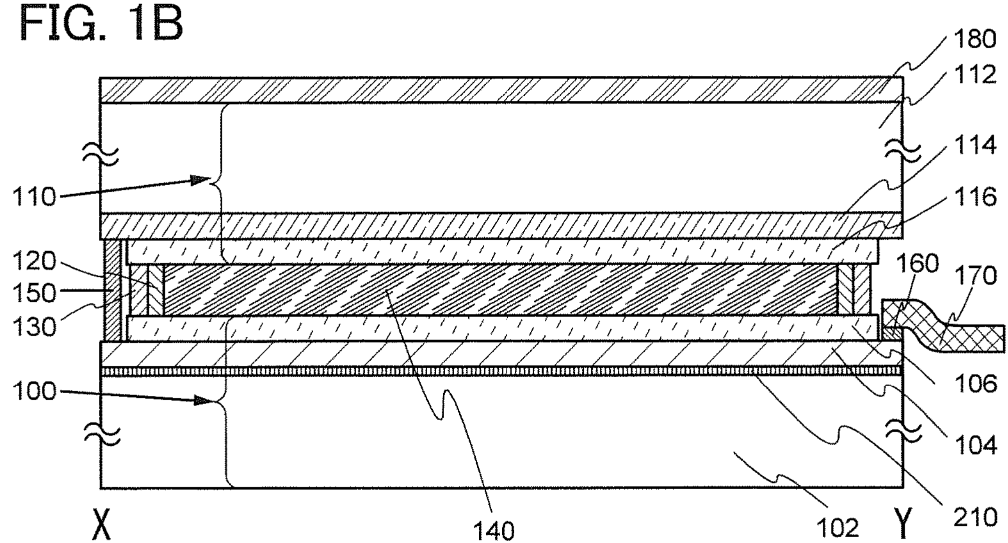

As an example of a structure of a liquid crystal device according to one embodiment of the disclosed invention, a top view of a vertical alignment (VA) mode reflective monochrome liquid crystal device in which a liquid crystal material is sandwiched between a base substrate and a counter substrate with the use of a first sealant and a second sealant is shown in FIG. 1A and a cross-sectional view taken along an alternate long and short dashed line of FIG. 1A is shown in FIG. 1B.

The value of fracture toughness of a base substrate 100 is greater than or equal to 1.5 [MPa·$m^{1/2}$], and an element layer 104 and a first alignment film 106 are stacked over one surface of a first substrate 102 in order with a fixing adhesive 210 provided between the first substrate 102 and the element layer 104. The base substrate 100 is thin, lightweight, and is less prone to fracture even in the case where force is applied from the outside, for example, an impact is made or bending is made.

The value of fracture toughness of the counter substrate 110 is greater than or equal to 1.5 [MPa·$m^{1/2}$], and an electrode film 114 and a second alignment film 116 are stacked over one surface of a second substrate 112 in order. The counter substrate 110 is thin, lightweight, and is less prone to fracture even in the case where force is applied from the outside, for example, an impact is made or bending is made. A polarizing plate 180 is provided on the counter substrate 110.

The first sealant 120 contains liquid crystal contaminants at less than or equal to $1\times10^{-4}$ wt % and is formed to be in contact with a liquid crystal material 140 and to surround the liquid crystal material seamlessly. Accordingly, a second sealant 130 is not in direct contact with the liquid crystal material 140; thus, liquid crystal contaminants contained in the second sealant 130 can be prevented from being mixed into the liquid crystal material 140.

Note that as liquid crystal contaminants, ionic impurities such as a metal ion, an inorganic anions or an organic acid, and materials in which such ionic impurities are generated through cure treatment performed in a step of manufacturing a liquid crystal device can be given.

The second sealant 130 is formed to be in contact with the first sealant 120 and to surround the first sealant 120. The base substrate 100 is bonded to the counter substrate 110 with a bond strength of greater than or equal to 1 [N/$mm^2$] with the use of the first sealant 120 and the second sealant 130. Thus, the base substrate 100 and the counter substrate 100 are bonded firmly without separation of the base substrate 100 from the counter substrate 110 even in the case where force is applied to the liquid crystal device from the outside.

A first conductive material 150 is provided so as to electrically connect part of the element layer 104 and part of the electrode film 114 to each other. Accordingly, voltage can be applied from the element layer 104 to the electrode film 114 through the first conductive material 150; thus, alignment of the liquid crystal material 140 can be changed by applying voltage to the liquid crystal material 140 which is sandwiched between the base substrate 100 and the counter substrate 110.

Further, an external connection terminal 170 is electrically connected to part of the element layer 104 through the second conductive material 160, and has a function of supplying electric power required for operation of the liquid crystal device to the element layer 104 through the second conductive material 160 from the outside.

Having the above-described structure, a liquid crystal device with high display quality, which is thin, lightweight, and is less prone to fracture even in the case where force is applied from the outside, for example, an impact is made or bending is made, can be provided. In the liquid crystal device, two substrates having high toughness with a liquid crystal material provided therebetween are not easily separated even in the case where strong force is applied from the outside, contamination of the liquid crystal material due to liquid crystal contaminants is suppressed, and alignment of the liquid crystal material can be performed in a given way.

<Method for Manufacturing Liquid Crystal Device>

Next, an example of a method for manufacturing the liquid crystal device is described with reference to FIGS. 2A to 2E, FIGS. 3A to 3C, FIGS. 4A and 4B, and FIGS. 5A and 5B. Note that the steps of manufacturing the liquid crystal device according in this embodiment can be broadly categorized into three steps: "a process of manufacturing a base substrate", "a process of manufacturing a counter substrate", and "a process of sealing a liquid crystal". Description of each process will be made below.

<Process of Manufacturing Liquid Crystal Device>

Figure 2A:
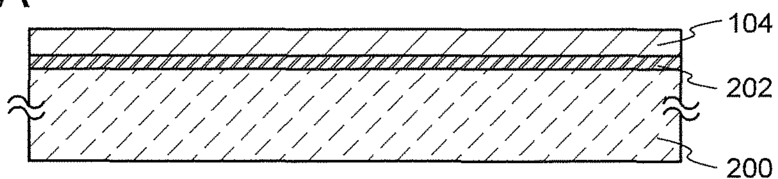
FIGS. 2A to 2E illustrate steps of manufacturing a liquid crystal device according to an embodiment.

First, the element layer 104 is formed over one surface of a substrate 200 for manufacturing an element layer (hereinafter simply referred to as the substrate 200) with a separation layer 202 provided therebetween (see FIG. 2A).

The substrate 200 may be a quartz substrate, a sapphire substrate, a ceramic substrate, a glass substrate, a metal substrate, or the like. Note that a substrate which is thick enough not to be obviously flexible is used for such a substrate, whereby an element such as a transistor can be formed with high accuracy. "Not obviously flexible" means that the elastic modulus of the substrate is higher than or equivalent to that of a glass substrate used in generally manufacturing a liquid crystal display.

The separation layer 202 is formed by a sputtering method, a plasma CVD method, a coating method, a printing method, or the like to be a single layer or a stacked layer made of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), and silicon (Si), an alloy material containing the element as its main component, or a compound material containing the element as its main component.

In the case where the separation layer 202 has a single layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum is formed. Note that the mixture of tungsten and molybdenum corresponds to an alloy of tungsten and molybdenum, for example.

In the case where the separation layer 202 has a stacked layer structure, preferably, a metal layer is formed as a first layer, and a metal oxide layer is formed as a second layer. Typically, it is preferable to form a tungsten layer, a molybdenum layer, or a layer containing a mixture of tungsten and molybdenum as the first layer and to form an oxide layer, a nitride layer, an oxynitride layer, or a nitride oxide layer of tungsten, molybdenum, or a mixture of tungsten and molybdenum as the second layer. When the metal oxide layer is formed as the second layer, an oxide layer (such as silicon oxide which can be utilized as an insulating layer) may be formed over the metal layer of the first layer so that an oxide of the metal is formed on a surface of the metal layer.

Before providing the separation layer 202 on the one surface of the substrate 200, fluid-jet cleaning, ultrasonic cleaning, plasma cleaning, UV cleaning, ozone cleaning, or the like is preferably performed on the substrate 200 so that dust and organic components attaching to the substrate 200 are removed.

The element layer 104 has at least a pixel electrode when the liquid crystal device is a passive-matrix liquid crystal device. Alternatively, the element layer 104 has at least a wiring, a pixel electrode, and a transistor (including a switching element) when the liquid crystal device is an active matrix liquid crystal device. This embodiment describes a VA mode; thus, an electrode for controlling the alignment of a liquid crystal is controlled by a vertical electric field generated by two opposite electrodes of a pixel electrode formed in the element layer 104 and a pixel electrode formed in the counter substrate (referred to as an electrode film in this specification). However the electrode for controlling the alignment of the liquid crystal may be controlled by a horizontal electric field by forming a pair of electrodes in the element layer 104. Further, elements necessary for an element substrate, such as a color filter, a black matrix, and a spacer material (a material for securing a space for providing the liquid crystal material 140 between the base substrate 100 and the counter substrate 110 when the base substrate 100 and the counter substrate 110 are bonded to each other) are included depending on limiting conditions such as a liquid crystal operation mode and a light extraction direction. Note that there are no particular points to be noted in the step of forming the element layer 104, and the element layer 104 is formed using a known technique as appropriate.

Figure 2B:
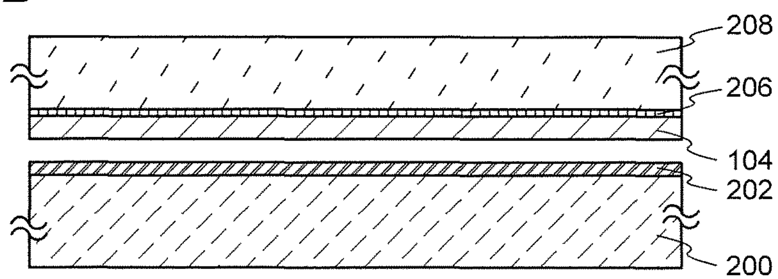

Next, the element layer 104 is separated from the separation layer 202 which is formed over the substrate 200 and transferred to a temporary support substrate 208 side in the state where the element layer 104 is bonded to the temporary support substrate 208 using an adhesive 206 for separation (see FIG. 2B). Thus, the element layer 104 is placed on the temporary support substrate 208 side. Note that in this specification, a process in which an element layer is transferred to the temporary support substrate 208 from the substrate 200 is referred to as a transfer process.

As the adhesive 206 for separation, a material which is soluble in water or a solvent, or a material which can lower adhesive force using irradiation with UV light or the like, is used. Thus, the adhesive 206 for separation can be removed from the temporary support substrate 208 and the element layer 104 in a later step. The adhesive 206 for separation is preferably formed to be thin and to have a uniform thickness using any of coating machines such as a spin coater, a slit coater, a gravure coater, and a roll coater, or any of printing machines such as a flexible printing machine, an offset printing machine, a gravure printing machine, a screen printing machine, and an ink jet machine.

As the temporary support substrate 208, a tape which can decrease adhesiveness of a surface in a given way, such as a UV peeling tape and a thermal peeling tape can be used. Alternatively, a glass substrate, a quartz substrate, a sapphire substrate, a ceramic substrate, a metal substrate, a plastic substrate, or the like may be used. Note that in the case where the tape which can decrease adherence of a surface in a given way is used, the adhesive 206 for separation is not necessarily required. The adhesive 206 is not necessarily be used when it does not affect transfer operation. In the case where a plastic substrate is used as the temporary support substrate 208, a plastic substrate having heat resistance high enough to withstand the temperature of a process performed later is preferably used.

Note that there is no particular limitation on the method for bonding the temporary support substrate 208 to the substrate 200. When a flexible material such as the tape is used as the temporary support substrate 208, a device which can perform bonding using a roller (also referred to as a roll laminator) may be used, for example. Accordingly, the substrate 200 and the temporary support substrate 208 can be stably bonded to each other without air bubbles and the like therebetween.

Various methods can be used as appropriate for a process for transferring the element layer 104 from the substrate 200 to the temporary support substrate 208. For example, when a layer including a metal oxide film is formed as the separation layer 202, the metal oxide film is embrittled by crystallization, so that the element layer 104 can be separated from the substrate 200. Further, when an amorphous silicon film containing hydrogen is formed as the separation layer 202 between the substrate 200 and the element layer 104, the amorphous silicon film containing hydrogen is removed by laser light irradiation or etching, so that the element layer 104 can be separated from the substrate 200. When a film containing nitrogen, oxygen, hydrogen, or the like (for example, an amorphous silicon film containing hydrogen, an alloy film containing hydrogen, an alloy film containing oxygen, or the like) is used as the separation layer 202, the separation layer 202 is irradiated with laser light to release nitrogen, oxygen, or hydrogen contained in the separation layer 202 as a gas, so that separation of the element layer 104 from the substrate 200 can be promoted. Further, a method in which the separation layer 202 is removed by etching with the use of a halogen fluoride gas such as $NF_3$, $BrF_3$, or $ClF_3$ can be used.

In addition to the above methods, a method in which the substrate 200 is removed by mechanically performing grinding treatment or polishing treatment on a surface of the substrate 200 on which the element layer 104 is not formed. In that case, the separation layer 202 is not necessarily provided.

Further, the separation process can be facilitated by using plural kinds of separation methods described above in combination. That is, the separation can be performed with physical force after performing laser light irradiation on the separation layer, etching on the separation layer with a gas, a solution, or the like, or mechanical removal of part of the separation layer with a sharp knife, a scalpel, or the like, in order that the separation layer and the element layer can be easily separated from each other. In the case where the separation layer 202 is formed to have a staked layer structure of metal and a metal oxide, the element layer can be physically separated easily from the separation layer by using a groove formed by laser light irradiation or a scratch made by a sharp knife, a scalpel, or the like as a trigger.

In the case where separation is performed with a physical means, the separation may be performed while a liquid such as water is poured. Thus, an adverse effect on the element layer 104 due to static electricity generated by separation operation (e.g., a phenomenon in which a semiconductor element is damaged by static electricity) can be suppressed.

In the transfer process, the element layer 104 is separated from the separation layer 202 in a state where the substrate 200 is fixed, whereby force can be prevented from being locally applied to the element layer 104 and separation can be performed finely. As a method for fixing the substrate 200, for example, a method for fixing the substrate 200 to a stable base using an adhesive material (or an adhesive material), a method for fixing the substrate 200 using a vacuum chuck, or the like is employed. It is preferable that the substrate 200 be fixed using a vacuum chuck in consideration of trouble for separating the substrate 200 and reuse of the substrate 200. Specifically, a vacuum chuck, which has a porous surface (also referred to as a porous chuck) is preferably used because that the entire surface of the substrate 200 can be fixed with uniform force.

Note that before providing the adhesive 206 for separation on the element layer 104, fluid-jet cleaning, ultrasonic cleaning, plasma cleaning, UV cleaning, ozone cleaning, or the like is performed on the element layer 104 so that dust and organic components attaching to the surface of the element layer 104 are removed.

Figure 2C:
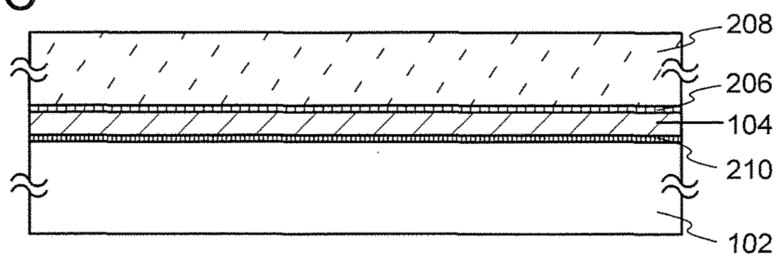
Figure 2D:
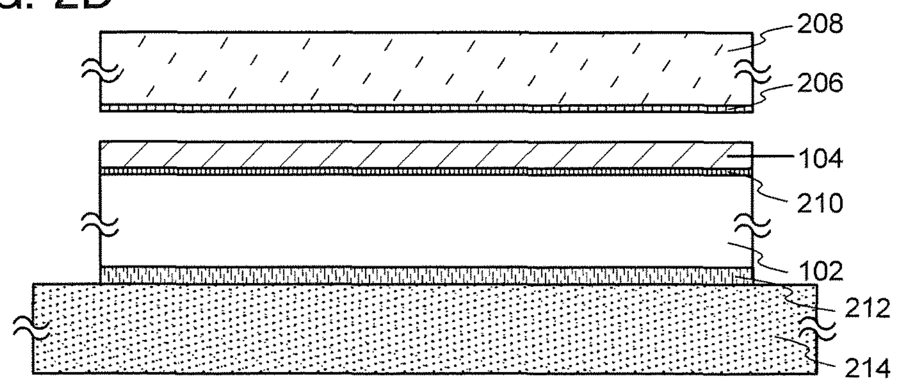
Figure 2E:
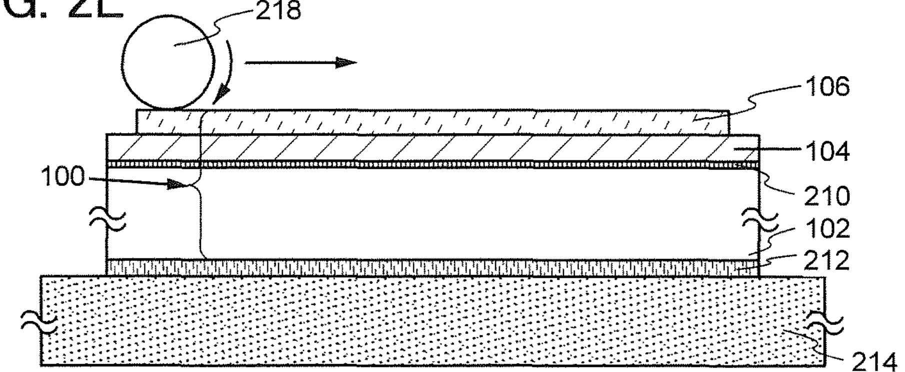

Next, the first substrate 102 is bonded to the element layer 104 with the fixing adhesive 210 provided therebetween (see FIG. 2C).

As a material of the fixing adhesive 210, various curable adhesives, e.g., a photo-curable adhesive such as a UV photo-curable adhesive, a reactive curable adhesive, a thermosetting adhesive, and an anaerobic adhesive can be used.

The fixing adhesive 210 is preferably formed to be thin and to have a uniform thickness using any of coating machines such as a spin coater, a slit coater, a gravure coater, and a roll coater, or any of printing machines such as a flexible machine, an offset machine, a gravure machine, a screen machine, and an ink-jet machine.

As the first substrate 102, any substrate with high toughness is used. For example, an organic resin substrate, an organic resin thin film, a metal substrate, a metal thin film, or the like is used. Thus, a base substrate which is thin, lightweight and is less prone to fracture in the case where force is applied from the outside, for example, an impact is made or bending is made, can be manufactured.

As the organic resin substrate and the organic resin thin film, for example, a substrate and a thin film including, as components, at least one or more kinds of resins selected from a polyethylene terephthalate (PET) resin, polyether sulfone (PES) resin, a polyethylene naphthalate (PEN) resin, a polyvinyl alcohol (PVA) resin, a polycarbonate (PC) resin, a nylon resin, an acrylic resin, a polyacrylonitrile resin; a polyetheretherketone (PEEK) resin, a polystyrene (PS) resin, a polysulfone (PSF) resin, a polyetherimide (PEI) resin, a polyarylate (PAR) resin, a polybutylene terephthalate (PBT) rein, a polyimide (PI) resin, a polyamide (PA) resin, a polyamide imide (PAI) resin, a polyisobutylene (PIB) resin, a chlorinated polyether (CP) resin, a melamine (MF) resin, an epoxy (EP) resin, a poly vinylidene chloride (PVDC) resin, a polypropylene (PP) resin, a polyacetal (POM) resin, a phenol (PF) resin, a furan (FF) resin, an unsaturated polyester (FRP) resin, a cellulose acetate (CA) resin, a urea (UF) resin, a xylene (XR) resin, a diallyl phthalate (DAP) resin, a polyvinyl acetate (PVAc) resin, a polyethylene (PE) resin, a fluorine resin, and an ABS resin can be used.

As the metal substrate or the metal thin film, for example, aluminum (Al), titanium (Ti), nickel (Ni), chromium (Cr), molybdenum (Mo), tantalum (Ta), beryllium (Be), zirconium (Zr), gold (Au), silver (Ag), copper (Cu), zinc (Zn), iron (Fe), lead (Pb), or tin (Sn), or a substrate or a thin film including an alloy containing any of these elements can be used.

In the case of a transmissive or transreflective liquid crystal device in which images are displayed using a backlight as a light source, the organic resin substrate having high transmittance of visible light is preferably used as the first substrate 102, more preferably a substrate having a coefficient of thermal expansion of less than or equal to 20 ppm/° C. with no retardation (birefringence phase difference) is used. Further, in the case of a reflective liquid crystal device in which images are displayed using reflection of outside light, the metal substrate having a high reflectance of visible light is preferably used as the first substrate 102. More preferably, a substrate having a coefficient of thermal expansion of less than or equal to 20 ppm/° C. is used.

Note that the first substrate 102 has a single layer structure in this embodiment; however, a protective film may be formed on a top surface or a bottom surface of the first substrate 102. As the protective film, an inorganic thin film such as a silicon oxide ($SiO_2$) film, a silicon nitride (SiN) film, a silicon oxynitride (SiON) film, and a silicon nitride oxide (SiNO) film, a metal film such as an aluminum (Al) film and a magnesium (Mg) film, or an oxide film of any of the metals can be used. Specifically, a film with low water vapor permeability, low gas permeability, and low UV permeability is preferably used.

As a method for forming such a protective film, for example, a sputtering method or a plasma CVD method is preferably used.

Further, as the protective film, a resin having a resistance to a solvent may be used. The component of the protective film is appropriately selected in accordance with kinds of a chemical solution used for substrate cleaning and a solvent included in the alignment film. The component of the protective film is appropriately selected from, for example, a vinyl chloride (PVC) resin, a polyvinyl alcohol (PVA) resin, a polyisobutylene (PIB) resin, an acrylic (methacryl) (PMMA) resin, a cellulose acetate (CA) resin, a urea (UF) resin, a xylene (XR) resin, a diallyl phthalate (DAP) resin, a polyvinyl acetate resin (PVAc), a polyethylene (PE) resin, a polyamide (PA) (nylon) resin, a polycarbonate (PC) resin, a chlorinated polyether (CP) resin, a melamine (MF) resin, an epoxy (EP) resin, a poly vinylidene chloride (PVdC) resin, polystyrene (PS), a polypropylene (PP) resin, a polyacetal (POM) resin, a phenol (PF) resin, a furan (FF) resin, an unsaturated polyester (FRP) resin, a fluorine resin, an ABS rein, or the like. Accordingly, a change in quality of the first substrate can be prevented with the use of the chemical solution used for substrate cleaning and the solvent included in the alignment film.

The protective film is preferably formed to be thin and to have a uniform thickness using any of coating machines such as a spin coater, a slit coater, a gravure coater, and a roll coater, or any of printing machines such as a flexible machine, an offset printing machine, a gravure printing machine, a screen printing machine, and an ink jet machine.

Note that before bonding the first substrate 102 to the element layer 104, fluid-jet cleaning, ultrasonic cleaning, plasma cleaning, UV cleaning, ozone cleaning, or the like is preferably performed on the first substrate 102 so that dust and organic components attaching to the first substrate 102 are removed.

Further, heat treatment may be performed on the first substrate 102. By the heat treatment, moisture and impurities attaching to the first substrate can be removed. Further, by the heat treatment in a reduced pressure state, moisture and impurities can be removed more efficiently. When the heat treatment is performed, a substrate with heat resistance high enough to withstand the heat treatment is preferably used as the first substrate 102.

Note that as for the cleaning method and the heat treatment, any one of the above cleaning methods and the heat treatment may be selected or two or more of the heat treatment and the cleaning methods may be performed in combination. For example, after fluid-jet cleaning is performed to remove dust attaching to the first substrate 102, ozone cleaning is performed to remove organic components, and then heat treatment is performed lastly to remove moisture attaching to and absorbed in the first substrate 102 when the fluid-jet cleaning is performed. In such a manner, dust, organic components and moisture in the first substrate 102 can be effectively removed.

Then, the temporary support substrate 208 is separated from the element layer 104. The adhesive 206 for separation is formed of a material which allows separation of the temporary support substrate 208 and the element layer 104 when needed; thus, the temporary support substrate 208 may be separated by a method appropriate for the material. Since the first substrate 102 has high toughness, the first substrate 102 has enough flexibility to be deformed by application of force from the outside. Thus, the temporary support substrate 208 is separated from the element layer 104 in the state where a first temporary fixing substrate 214 is bonded to the first substrate 102 with a slightly adhesive material 212 provided between the temporary fixing substrate 214 and the first substrate 102 so that deformation or fracture is not produced when force is applied in separation operation and a later step. Thus, the first temporary fixing substrate 214 can prevent deformation of the first substrate 102 even in the case where force is applied to the first substrate 102 from the outside, whereby deformation or fracture of the first substrate 102 can be prevented from occurring. Furthermore, even when the first substrate 102 with high toughness used in the base substrate 100 has flexibility, the first temporary fixing substrate 214 can prevent deformation or fracture of the first substrate 102. Thus, a general manufacturing apparatus used for manufacturing a liquid crystal device using a glass substrate can be used without any change (see FIG. 2D).

As the slightly adhesive material 212, a material (e.g., a UV peeling tape and a thermal peeling tape) whose adhesiveness of a surface can be decreased by treatment such as light irradiation or heat treatment, or a material (e.g., a slightly adhesive sheet, a silicon sheet, and a rubber sheet) whose adhesiveness of a surface is low enough to allow separation of the first substrate 102 without treatment for reducing adhesiveness may be used.

As the first temporary fixing substrate 214, a quartz substrate, a sapphire substrate, a ceramic substrate, a glass substrate, a metal substrate, or the like can be used. Note that such a substrate which is thick enough not to be obviously flexible is preferably used. In a later step, cure treatment is performed on the first sealant 120, the second sealant 130, and the first conductive material 150. In the case where a photo-curable material is used for these materials, a light-transmitting substrate is preferably used as the first temporary fixing substrate 214.

Note that the slightly adhesive material 212 and the first temporary fixing substrate 214 may be bonded to each other with the use of adhesiveness of the slightly adhesive material 212, or may be bonded to each other with the use of an adhesive.

Note that the element layer 104 is provided for the first substrate 102 with the fixing adhesive 210 provided therebetween by the transfer process in this embodiment; however, the fixing adhesive 210 is not necessarily provided. For example, a wiring, a common electrode, and a pixel electrode can be formed by discharging ink containing minute metal particles over a substrate using an ink-jet machine or a dispenser to form a pattern, and then performing cure treatment such as heating, and an interlayer insulating film can be also formed by providing an organic material having a high insulating property, such as polyimide, using an ink-jet machine, a dispenser, or a spin coater, and then performing cure treatment such as heating. Similarly, a black matrix and a color filter can be also formed by using an ink-jet machine or a dispenser. As described above, the element layer 104 can be formed in direct contact with the first substrate 102 using a machine with which a film is formed by a wet process, such as an ink-jet machine, a dispenser, or a spin coater.

The fixing adhesive 210 is formed between the first substrate 102 and the element layer 104 in the diagrams of this embodiment; however, the fixing adhesive 210 is not necessarily provided when the element layer 104 is formed by the wet process as described above.

When the element layer 104 is formed directly over the first substrate 102 by the wet process, it is necessary to perform cure treatment such as heating to the materials provided over the first substrate 102. Thus, a substrate having heat resistance high enough to withstand the heat treatment is preferably used as the first substrate 102.

Next, the first alignment film 106 is provided on the element layer 104, and rubbing treatment is performed on the first alignment film 106. Therefore, the base substrate 100 in which the element layer 104 and the first alignment film 106 are formed over the first substrate 102 in this order is completed (see FIG. 2E).

The first alignment film 106 may be formed on the element layer 104 using any of coating machines such as a spin coater, a slit coater, a gravure coater, and a roll coater, or any of printing machines such as a flexible printing machine, an offset printing machine, a gravure printing machine, a screen printing machine, and an ink-jet machine.

A rubbing treatment member 218 used in the rubbing treatment is generally used while being installed in a rubbing treatment apparatus. As the rubbing treatment member 218, for example, a roller whose surface (a surface to be in contact with the first alignment film) is provided with fiber including rayon fiber, cotton fiber, nylon fiber, or the like as its main component is used. The alignment film is rubbed with the rubbing treatment member 218, whereby the alignment film can have alignment properties.

After performing the rubbing treatment, a spacer material (a material for securing a space, so-called a gap, for providing the liquid crystal material 140 between the base substrate 100 and the counter substrate 110 when the base substrate 100 and the counter substrate 110 are bonded to each other) may be provided for the first alignment film as necessary.

<Manufacturing Process of Counter Substrate>

Figure 3A:
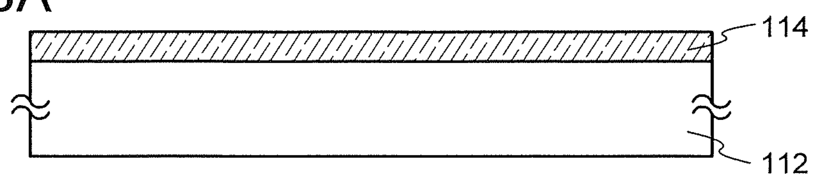
FIGS. 3A to 3C illustrate steps of manufacturing a liquid crystal device according to an embodiment.

First, the second substrate 112 is prepared and the electrode film 114 is provided on one surface of the second substrate 112 (see FIG. 3A).

Note that, in this embodiment, a color filter is not provided because description is made on a reflective monochrome liquid crystal device; however, a color filter may be provided between the second substrate 112 and the electrode film 114 in a color liquid crystal device.

Further, in this embodiment, the electrode film 114 is provided because description is made on a vertical alignment (VA) mode liquid crystal device; however, the electrode film 114 is not necessarily provided when a driving mode which does not need an electrode film on a counter substrate side, such as a horizontal electric field mode is employed.

Any substrate having high toughness is used as the second substrate 112. For example, an organic resin substrate, an organic resin thin film, or the like is used. Thus, a base substrate which is thin, lightweight, and is less prone to fracture even in the case where force is applied from the outside, for example, an impact is made or bending is made, can be manufactured.

As the organic resin substrate and the organic resin thin film, for example, a substrate and a thin film including as components at least one kind of resin selected from a polyethylene terephthalate (PET) resin, a polyether sulfone (PES) resin, a polyethylene naphthalate (PEN) resin, a polyvinyl alcohol (PVA) resin, a polycarbonate (PC) resin, a nylon resin, an acrylic resin, a polyacrylonitrile resin, a polyetheretherketone (PEEK) resin, a polystyrene (PS) resin, a polysulfone (PSF) resin, a polyetherimide (PEI) resin, a polyarylate (PAR) resin, a polybutylene terephthalate (PBT) rein, a polyimide (PI) resin, a polyamide (PA) resin, a polyamide imide (PAI) resin, a polyisobutylene (PIB) resin, a chlorinated polyether (CP) resin, a melamine (MF) resin, an epoxy (EP) resin, a poly vinylidene chloride (PVDC) resin, a polypropylene (PP) resin, a polyoxymethylene (POM) resin, a phenol (PF) resin, a furan (FF) resin, a fiber reinforced plastic (FRP) resin, a cellulose acetate (CA) resin, a urea (UF) resin, a xylene (XR) resin, a diallyl phthalate (DAP) resin, a polyvinyl acetate (PVAc) resin, a polyethylene (PE) resin, a fluorine resin and an ABS resin, can be used.

In the case of a transmissive or transflective liquid crystal device in which images are displayed using a backlight or the like as a light source, a substrate having a high resistance to a solvent and having a coefficient of thermal expansion of less than or equal to 20 ppm/° C., with no retardation (birefringence phase difference) is preferably used as the second substrate 112. Further, in the case of a reflective liquid crystal device in which image is displayed using reflection of outside light, a substrate having similar properties is preferable.

Note that the second substrate 112 has a single layer structure in this embodiment; however, a protective film may be formed on a top surface or a bottom surface of the second substrate 112. As the protective film, an inorganic thin film such as a silicon oxide ($SiO_2$) film, a silicon nitride (SiN) film, a silicon (SiON) oxynitride film or a silicon nitride oxide (SiNO) film, a metal film such as an aluminum (Al) film or a magnesium (Mg) film, or an oxide film of any of the metals can be used. Specifically, a film with low water vapor permeability, low gas permeability, and low UV permeability is preferably used.

The protective film is preferably formed by a sputtering method or a plasma CVD method, for example.

Further, as the protective film, a resin having a resistance to a solvent may be used. The component of the protective film is appropriately selected in accordance with kinds of a chemical solution used for substrate cleaning and a solvent included in the alignment film. The component of the protective film is appropriately selected from, for example, a vinyl chloride (PVC) resin, a polyvinyl alcohol (PVA) resin, a polyisobutylene (PIB) resin, an acrylic (methacryl) (PMMA) resin, a cellulose acetate (CA) resin, a urea (UF) resin, a xylene (XR) resin, a diallyl phthalate (DAP) resin, a polyvinyl acetate resin (PVAc), a polyethylene (PE) resin, a polyamide (PA) (nylon) resin, a polycarbonate (PC) resin, a chlorinated polyether (CP) resin, a melamine (MF) resin, an epoxy (EP) resin, a poly vinylidene chloride (PVDC) resin, polystyrene (PS), a polypropylene (PP) resin, a polyoxymethylene (POM) resin, a phenol (PF) resin, a furan (FF) resin, an unsaturated polyester (FRP) resin, a fluorine resin, an ABS rein, or the like. Accordingly, a change in quality of the second substrate can be prevented with the use of the chemical solution used for substrate cleaning and the solvent included in the alignment film.

The protective film is preferably formed to be thin and to have a uniform thickness using any of coating machines such as a spin coater, a slit coater, a gravure coater, and a roll coater, or any of printing machines such as a flexible printing machine, an offset printing machine, a gravure printing machine, a screen printing machine, and an ink-jet machine.

Note that before providing the electrode film 114 over the second substrate 112, fluid-jet cleaning, ultrasonic cleaning, plasma cleaning, UV cleaning, ozone cleaning, or the like is preferably performed on the second substrate 112 so that dust and organic components attaching to the second substrate 112 are removed.

Further, heat treatment may be performed on the second substrate 112. By the heat treatment, moisture and impurities attaching to the first substrate can be removed. Further, by the heat treatment in a reduced pressure state, moisture and impurities can be removed more efficiently. When the heat treatment is performed, a substrate with heat resistance high enough to withstand the heat treatment is preferably used as the second substrate 112.

Note that as for the cleaning method and the heat treatment, any one of the above cleaning methods and the heat treatment may be selected or two or more of the heat treatment and the cleaning methods may be performed in combination. For example, after fluid-jet cleaning is performed to remove dust attaching to the second substrate 112, ozone cleaning is performed to remove organic components, and then heat treatment is performed lastly to remove moisture attaching to and absorbed in the second substrate 112 when the fluid-jet cleaning is performed. In such a manner, dust, organic components and moisture in the second substrate 112 can be effectively removed.

The electrode film 114 is formed by a sputtering method, a plasma CVD method, a coating method, a printing method, or the like to be a single layer or a stacked layer using a layer containing as its main component a light-transmitting conductive material such as indium oxide containing tungsten oxide, indium zinc oxide containing tungsten oxide, indium oxide containing titanium oxide, indium tin oxide containing titanium oxide, indium tin oxide (hereinafter, referred to as ITO), indium zinc oxide, or indium tin oxide to which silicon oxide is added.

Figure 3B:
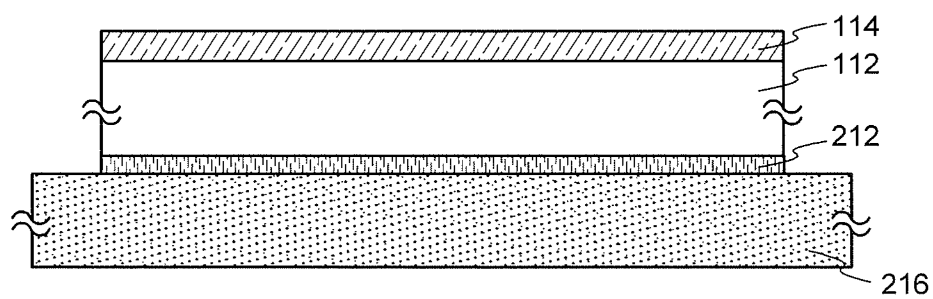
Figure 3C:
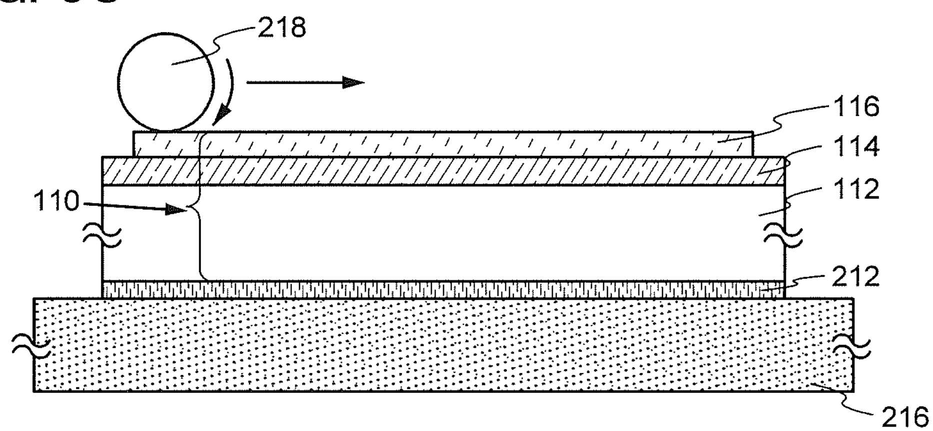

Similar to the manufacturing process of the base substrate, a second temporary fixing substrate 216 is bonded to the second substrate 112 with the slightly adhesive material 212 provided therebetween (see FIG. 3B). Thus, the second temporary fixing substrate 216 can prevent deformation of the second substrate 112 even in the case where force is applied to the second substrate 112 from the outside, whereby deformation or fracture of the second substrate 112 can be prevented from occurring. Furthermore, even when the second substrate 112 with high toughness has flexibility, the second temporary fixing substrate 216 can prevent deformation or fracture; thus, a general manufacturing apparatus used for manufacturing a liquid crystal device using a glass substrate can be used without any change.

As the slightly adhesive material 212, a material (e.g., a UV peeling tape and a thermal peeling tape) whose adhesiveness of a surface can decreased by treatment such as light irradiation or heat treatment, or a material (e.g., a slightly adhesive sheet, a silicon sheet, and a rubber sheet) whose adhesiveness of a surface is low enough to allow separation of the second substrate 112 without treatment for reducing adhesivenss may be used.

As the second temporary fixing substrate 216, a quartz substrate, a sapphire substrate, a ceramic substrate, a glass substrate, a metal substrate, or the like can be used. Note that such a substrate which is thick enough not to be obviously flexible is preferably used. In a later step, cure treatment is performed on the first sealant 120, the second sealant 130, and the first conductive material 150. In the case where a photo-curable material is used for these materials, a light-transmitting substrate is preferably used as the second temporary fixing substrate 216.

Note that the slightly adhesive material 212 and the second temporary fixing substrate 216 may be bonded to each other with the use of adhesiveness of the slightly adhesive material 212, or may be bonded to each other with the use of an adhesive.

Next, the second alignment film 116 is provided on the electrode film 114, and rubbing treatment is performed on the second alignment film 116 using the rubbing treatment member 218. Therefore, the counter substrate 110 in which the electrode film 114 and the second alignment film 116 are formed over the second substrate 112 in this order is completed (see FIG. 3C).

The second alignment film 116 may be formed on the electrode film 114 using various coating machines such as a spin coater, a slit coater, a gravure coater and a roll coater, or various printing machines such as a flexible printing machine, an offset printing machine, a gravure printing machine, a screen printing machine and an ink-jet machine.

As the second alignment film 116, an insulative organic material such as polyimide (PI), polyvinyl alcohol (PVA), or polyvinylcinnamate (PVCi) may be used.

As the rubbing treatment member 218 used in the rubbing treatment, for example, a roller whose surface (a surface to be in contact with the first alignment film) is provided with fiber including rayon fiber, cotton fiber, nylon fiber, or the like as its main component is used. The alignment film is rubbed with the rubbing treatment member 218, whereby the alignment film can have alignment properties.

After performing the rubbing treatment, a spacer material (a material for securing a space, so-called a gap, for providing the liquid crystal material 140 between the base substrate 100 and the counter substrate 110 when the base substrate 100 and the counter substrate 110 are bonded to each other) may be provided to the second alignment film 116 as necessary.

Note that the base substrate manufacturing process is followed by the counter substrate manufacturing process in this embodiment; however, the manufacturing order is not limited to this. The base substrate manufacturing process may be performed after the counter substrate manufacturing process, or the processes may be performed at the same time. The base substrate manufacturing process and the counter substrate manufacturing process are preferably performed at the same time to shorten manufacturing time of the liquid crystal device.

<Sealing Process of Liquid Crystal>

Figure 4A:
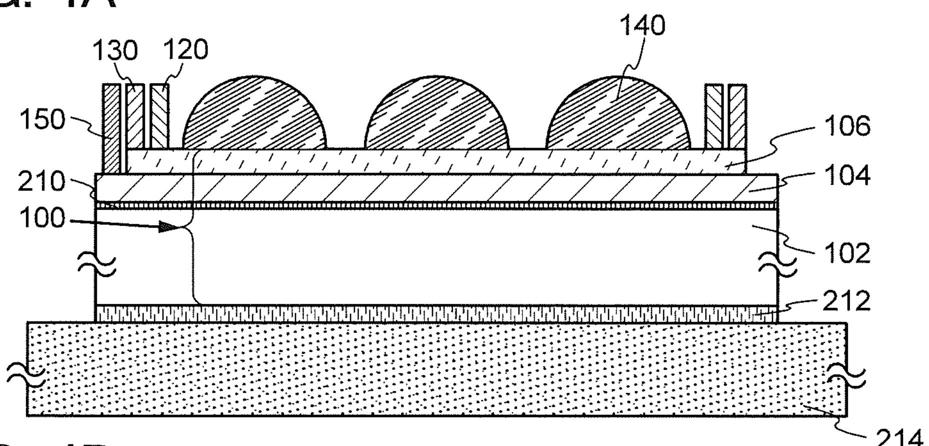
FIGS. 4A and 4B illustrate steps of manufacturing a liquid crystal device according to an embodiment.
Figure 4B:
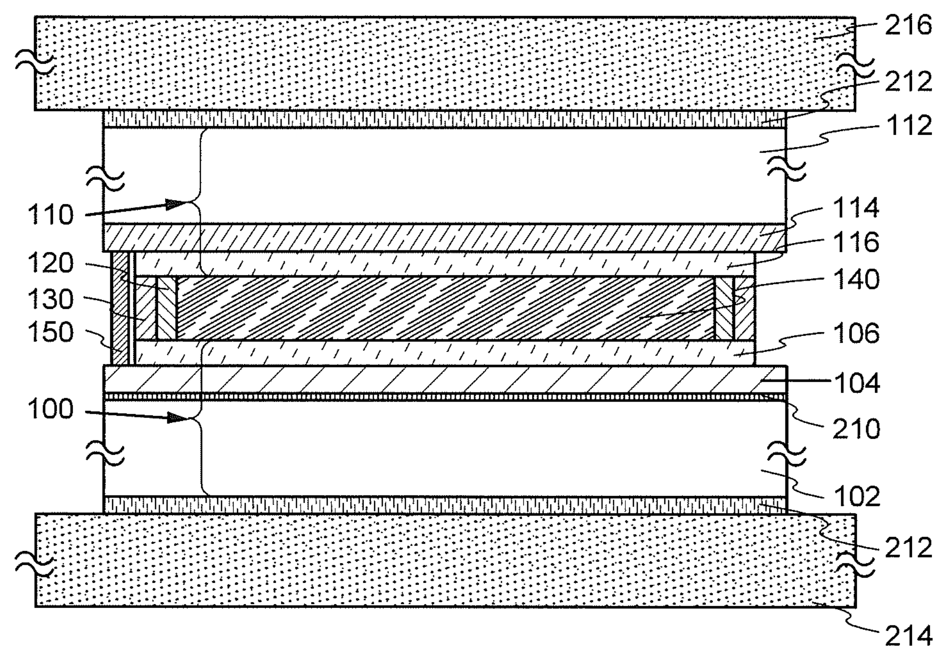

First, the base substrate 100 to which the first temporary fixing substrate 214 is bonded with the slightly adhesive material 212 in the base substrate manufacturing process is prepared, and is provided with the first sealant 120, the second sealant 130, the liquid crystal material 140, and the first conductive material 150 (see FIG. 4A).

The first sealant 120 is formed between the liquid crystal material 140 and the second sealant 130 so as to surround the liquid crystal material 140 seamlessly. Any of the following printing machines such as a flexible printing machine, an offset printing machine, a gravure printing machine, a screen printing machine, an ink jet machine, and a dispenser can be used.

The first sealant 120 serves to prevent contact between the second sealant 130 and the liquid crystal material 140 and mixture of liquid crystal contaminants into the liquid crystal material 140 from the second sealant 130. Thus, it is necessary that the amount of liquid crystal contaminants included in the first sealant 120 be reduced as much as possible. Specifically, the concentration of the liquid crystal contaminants included in the first sealant 120 is preferably less than or equal to $1\times10^{-4}$ wt %, more preferably $1\times10^{-6}$ wt %.

As the first sealant 120, various curable adhesives, e.g., a photo-curable adhesive such as a UV photo-curable adhesive, a reactive curable adhesive, a thermosetting curable adhesive, and an anaerobic adhesive can be used. In view of the influence on various materials used for the liquid crystal device and productivity, a photo-curable adhesive which does not need cure treatment under a high temperature condition and is cured in a short time, is preferably used.

There are two types of photo-curable adhesives: a photo-cationic curable adhesive, in which a polymerization initiator generating a cationic component by light irradiation from the outside is used, and a photo-radical curable material, in which a polymerization initiator generating a radical component by light irradiation from the outside is used. Among them, ionic impurities such as cationic components may become a factor that causes alignment disorder of liquid crystals and a reduction in a voltage holding rate of a liquid crystal. Thus, as the first sealant 120, a photo-radical curable adhesive, in which ionic impurities such as a cation component are not likely to be leached out, is preferably used.

Further, the first sealant 120 may include a spacer material (a material for securing a space, so-called a gap, for providing the liquid crystal material 140 between the base substrate 100 and the counter substrate 110 when the base substrate 100 and the counter substrate 110 are bonded to each other).

Note that description is made on the photo-curable adhesive; however, the present invention is not limited thereto and various adhesives can be appropriately used.

The second sealant 130 is formed so as to surround the first sealant 120. Any of the following printing machines such as a flexible printing machine, an offset printing machine, a gravure printing machine, a screen printing machine, an ink-jet machine, and a dispenser can be used.

As the second sealant 130, various curable adhesives, e.g., a photo-curable adhesive such as a UV photo-curable adhesive, a reactive curable adhesive, a thermosetting curable adhesive, and an anaerobic adhesive can be used. In view of the influence on various materials used for the liquid crystal device and productivity, a photo-curable adhesive which does not need cure treatment under a high temperature condition and is cured in a short time, is preferably used.

The second sealant 130 is not in direct contact with the liquid crystal material 140, various additive materials can be added without concern for contamination of the liquid crystal material 140. Thus, a wide variety of materials can be used. For example, as for the photo-curable adhesive, other than the photo-radical curable adhesive, a photo-cationic curable adhesive in which a polymerization initiator generating a cationic component that is a liquid crystal contaminant by light irradiation from the outside is used, may be used. The photo-cationic curable adhesive has such advantages that cure shrinkage that is generated during the cure treatment is small and adhesive force to an object is strong.

Further, the second sealant 130 may include a spacer material (a material for securing a space, so-called a gap, for providing the liquid crystal material 140 between the base substrate 100 and the counter substrate 110 when the base substrate 100 and the counter substrate 110 are bonded to each other).

As described above, additive materials which cause adverse effects on the liquid crystal material 140 can be added to the second sealant 130; thus, the range of choices of the sealant is large. For example, the use of a sealant whose elasticity after the cure treatment is high can relieve force which is applied as a result of deformation of the sealant in the case where force from the outside is applied to the liquid crystal device.

Further, a wide range of sealants can be used for the second sealant 130; thus, the second sealant 130 tends to have strong adhesive force to the base substrate 100 and the counter substrate 110 than the first sealant 120.

In addition to the effect of preventing mixture of liquid crystal contaminants into the liquid crystal material 140 from the second sealant 130, the first sealant 120 serves to prevent the spread of the liquid crystal material 140 toward the periphery of the substrate and to decide the shape of a sealing region of the liquid crystal material 140 (e.g., the first sealant 120 is provided roundly so as to surround the liquid crystal material in the case where the liquid crystal material is to be formed in a round shape) when the base substrate 100 and the counter substrate 110 are bonded to each other.

Because the second sealant 130 does not affect the shape of the sealing region of the liquid crystal material 140, the second sealant 130 can have any shape as long as it surrounds the first sealant 120. For example, the second sealant 130 is formed in a wave shape, so that the bonding area of the second sealant 130 can be increased. Thus, the bond between the base substrate 100 and the counter substrate 110 can be further strengthened.

Description is made on the photo-curable adhesive; however, the present invention is not limited thereto and various adhesives can be appropriately used.

Note that only the first sealant 120 and the second sealant 130 are used in this embodiment; however, a third sealant may be further provided so as to surround the second sealant 130.

In many cases, the second sealant 130 for strongly bonding a substrate having high toughness enters a depressed portion of a bonding surface of a bonding object and dissolves the surface of the bonding object with a solvent, whereby strong adhesion can be obtained. The viscosity of a sealant before being cured is generally low. Therefore, the second sealant 130 protrudes from end faces of the base substrate 100 and counter substrate 110 when they are bonded to each other, which causes a decrease in adhesive force.

Thus, the third sealant 130 is formed so as to surround the second sealant 130 seamlessly, whereby the second sealant 130 is held between the first sealant 120 and the third sealant. Accordingly, a decrease in adhesive force between the base substrate 100 and the counter substrate 110, which is caused by protrusion of the second sealant 130 from the end faces of the base substrate 100 and counter substrate 110, can be prevented.

As the first conductive material 150, a material including a conductive particle and an organic resin is used. Specifically, a material in which conductive particles each having a diameter of several nanometers to several tens of micrometers are dissolved or dispersed in an organic resin is used. As the conductive particles, metal particles of one or more of gold (Au), silver (Ag), copper (Cu), nickel (Ni), platinum (Pt), palladium (Pd), tantalum (Ta), molybdenum (Mo), titanium (Ti), aluminum (Al), and carbon (C), an insulating particle (such as a glass particle or an organic resin particle) whose surface is provided with a metal film including any of the above metals, a microparticle of silver halide, or a dispersible nanoparticle can be used. In addition, as the organic resin included in the first conductive material 150, one or a plurality of organic resins each serving as a binder, a solvent, a dispersant, or a coating member of the metal particle can be used. Typically, organic resins such as an epoxy resin or a silicone resin can be given.

As a method for providing the first conductive material 150, any of the following printing machines such as a flexible printing machine, an offset printing machine, a gravure printing machine, a screen printing machine, an ink jet machine, and a dispenser can be used.

Next, the liquid crystal material 140 is provided in a region surrounded by the first sealant 120.

As the liquid crystal material 140, a lyotropic liquid crystal, a thermotropic liquid crystal, a low molecular liquid crystal, a high molecular liquid crystal, a discotic liquid crystal, a ferroelectric liquid crystal, an anti-ferroelectric liquid crystal, or the like is used. Note that the above liquid crystal materials exhibit a nematic phase, a cholesteric phase, a cholesteric blue phase, a smectic phase, a smectic blue phase, a cubic phase, a smectic D phase, a chiral nematic phase, an isotropic phase, or the like depending on conditions. A cholesteric blue phase and a smectic blue phase are seen in a liquid crystal material having a cholesteric phase or a smectic phase with a relatively short helical pitch of less than or equal to 500 nm. The alignment of the liquid crystal material has a double twist structure. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which 5 wt % or more of a chiral material is mixed is used for the liquid crystal material in order to broaden the temperature range. As for the liquid crystal composition which contains a blue-phase liquid crystal and a chiral material, the response speed is as high as 10 μs to 100 μs; an alignment film is not necessary due to optical isotropy; and viewing angle dependence is low. Thus, alignment of the liquid crystal material can be adjusted at high speed even in the case where the first alignment film 106 and the second alignment film 116 are omitted from the structure of the liquid crystal device illustrated in this embodiment, whereby quality of a display image can be improved and cost can be reduced.

As a method for providing the liquid crystal material 140, any of the following printing machines such as a flexible printing machine, an offset printing machine, a gravure printing machine, a screen printing machine, an ink-jet machine, and a dispenser can be used.

Then, the surface of the counter substrate 110, on which the second alignment film 116 is formed, is bonded to a surface of the base substrate 100, on which the liquid crystal material 140 is formed. At the same time, cure treatment is performed on the first sealant 120, the second sealant 130, and the first conductive material 150 (see FIG. 4B).

The base substrate 100 and the counter substrate 110 are preferably bonded to each other in a treatment chamber kept in a reduced pressure state in a vacuum bonding apparatus or the like. Thus, the base substrate 100 and the counter substrate 110 can be bonded to each other without mixture of air bubbles in the sealants or the liquid crystal material. Further, inclusion of an atmospheric component in the region surrounded by the first sealant 120 can be suppressed.

Note that after the bonding treatment is performed, a process for applying pressure to one side or both sides of the base substrate 100 and counter substrate 110 is preferably performed. Thus, the liquid crystal material 140 is closely and uniformly formed in the region surrounded by the first sealant 120.

The cure treatment is performed by one or plural kinds of processes selected from irradiation of visible light, irradiation of UV light, and heat treatment depending on material components of the first sealant 120, the second sealant 130, and the first conductive material 150 such that the cure states of the first sealant 120, the second sealant 130, and the first conductive material 150 are optimized. In the case where the first sealant 120, the second sealant 130, and the first conductive material 150 are photo-curable materials for example, the wavelength, the intensity, and the time of irradiation light are selected as appropriate depending on cure conditions of the materials. Note that when materials for which cure conditions are the same (e.g., the first sealant 120, the second sealant 130, the first conductive material 150 are all photo-curable materials, and curing wavelength and curing strength are almost the same) are used, the number of times of cure treatment can be reduced, which is preferable. To improve conductivity of the first conductive material 150 itself and to prevent defective conduction between the element layer 104, the electrode film 114, and the first conductive material 150, pressure is preferably applied when the first conductive material 150 is cured.

By the above treatment, the base substrate 100 and the counter substrate 110 are bonded to each other with the first sealant 120 and the second sealant 130 with a bond strength of greater than or equal to 1 [N/mm$^2$]. Accordingly, a liquid crystal device in which the base substrate and the counter substrate are not easily separated even in the case where strong force is applied from the outside can be manufactured.

Further, part of the element layer 104 in the base substrate 100 and part of the electrode film 114 in the counter substrate 110 are electrically connected with the use of the first conductive material 150; thus, alignment of the liquid crystal material 140 can be adjusted in a given way. Accordingly, a liquid crystal device with high display quality can be manufactured.

In this embodiment, a method (a dropping method) is used in which the base substrate 100 and the counter substrate 110 are bonded to each other after dropping the liquid crystal material 140. Alternatively, a method (an injecting method) may be used in which, after bonding the base substrate 100 and the counter substrate 110 to each other, the liquid crystal material 140 is injected into the region surrounded by the first sealant 120 utilizing a capillary phenomenon in a space generated between the base substrate 100 and the counter substrate 110. In the injecting method, after providing the first sealant 120 and the second sealant 130 over the base substrate 100, the base substrate 100 and the counter substrate 110 are bonded to each other and then the liquid crystal material 140 is injected into the region surrounded by the first sealant 120. The injecting method is a little different from the manufacturing order described in this embodiment; however, the injecting method is known and the context is easily understood by those skilled in the art; thus, detailed description is omitted.

Figure 5A:
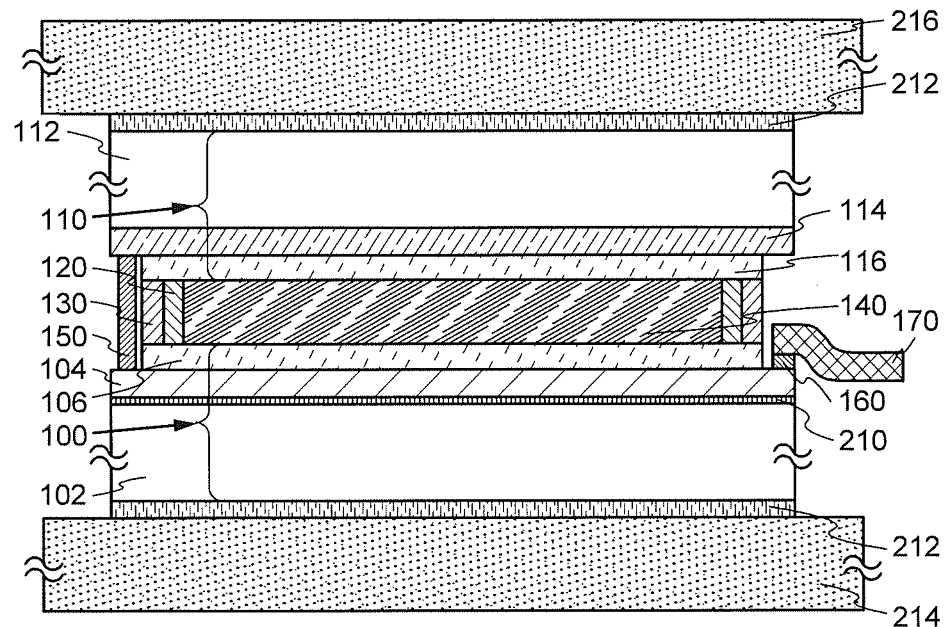
FIGS. 5A and 5B illustrate steps of manufacturing a liquid crystal device according to an embodiment.

Next, the external connection terminal 170 is provided to the part of the element layer 104 in the base substrate 100 with the second conductive material 160 provided therebetween and a connection process is performed, whereby part of the element layer 104 is electrically connected to the external connection terminal 170 (see FIG. 5A).

As the second conductive material 160, a material including a conductive particle and an organic resin is used. Specifically, a material in which conductive particles each having a diameter of several nanometers to several tens of micrometers are dissolved or dispersed in an organic resin is used. As the conductive particles, metal particles of one or more of gold (Au), silver (Ag), copper (Cu), nickel (Ni), platinum (Pt), palladium (Pd), tantalum (Ta), molybdenum (Mo), titanium (Ti), aluminum (Al), and carbon (C), an insulating particle whose surface is provided with a metal film including any of the above metals, a microparticle of silver halide, a dispersible nanoparticle, or a solder material can be used. In addition, as the organic resin included in the second conductive material 160, one or a plurality of organic resins each serving as a binder, a solvent, a dispersant, or a coating member of the metal particle can be used. Typically, organic resins such as an epoxy resin and a silicone resin can be given.

As the external connection terminal 170, a printed wiring board or a flexible printed circuit (FPC) can be used. In the liquid crystal device in this embodiment, both the base substrate and the counter substrate have high toughness and the liquid crystal device may have flexibility; thus, it is preferable that the external connection terminal 170 also have flexibility.

As the connection treatment, the second conductive material 160 may be under a condition for curing the second conductive material 160 (irradiation of visible light, irradiation of UV light, or heat treatment). To improve conductivity of the second conductive material 160 itself and to prevent defective conduction between the element layer 104 and the second conductive material 160, pressure is preferably applied when the second conductive material 160 is in the connection process. For example, the connection process may be performed using a thermocompression bonding apparatus in which heat treatment is performed while pressure treatment is performed on the second conductive material 160 and the external connection terminal 170.

Figure 5B:
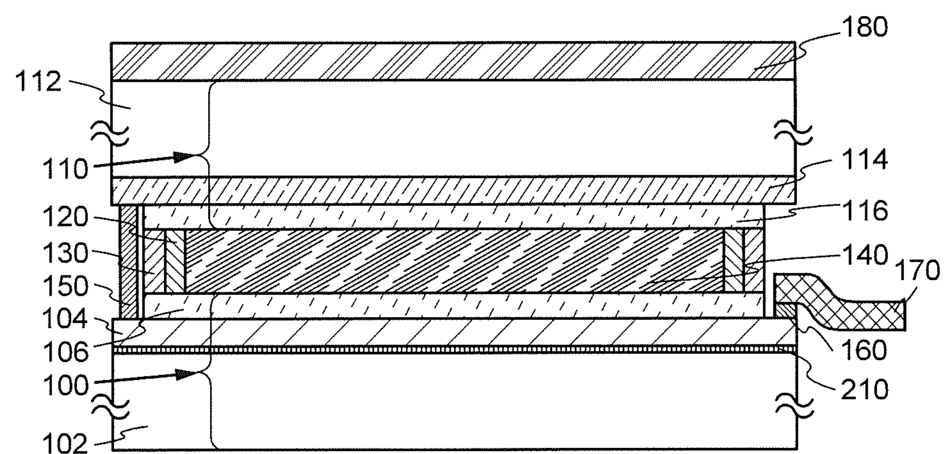

After the slightly adhesive material 212 and the first temporary fixing substrate 214 are separated from the base substrate 100 and the slightly adhesive material 212 and the second temporary fixing substrate 216 are separated from the counter substrate 110, the polarizing plate 180 is bonded to the second substrate 112 (see FIG. 5B).

Note that the polarizing plate 180 is provided only on the second substrate 112 side because description is made on a reflective liquid crystal device in this embodiment; however, a polarizing plate may be also provided on the first substrate 102 side in the case of a transmissive liquid crystal device.

Through the above steps, a liquid crystal device with high display quality which is thin, lightweight, and is less prone to fracture even in the case where force is applied from the outside, for example, an impact is made or bending is made, can be provided. In the liquid crystal device, two substrates having high toughness with a liquid crystal material provided therebetween are not easily separated even in the case where strong force is applied from the outside, and contamination of a liquid crystal material due to liquid crystal contaminants is suppressed.

Note that a backlight is not provided because description is made on a reflective liquid crystal device in this embodiment; however, a backlight may be provided on the base substrate 100 side in the case of a transmissive liquid crystal device.

According to one embodiment of the present invention, a liquid crystal device is manufactured in the state where the first temporary fixing substrate 214 is bonded to the base substrate 100 with the slightly adhesive material 212 provided therebetween and the second temporary fixing substrate 216 is bonded to the counter substrate 110 with the slightly adhesive material 212 provided therebetween; thus, deformation or fracture of the base substrate 100 and the counter substrate 110 due to force applied in manufacturing the device can be suppressed.

Therefore, a liquid crystal device with high display quality can be manufactured with high yield.

Embodiment 2

A structure of a liquid crystal device whose components are partly different from those described in Embodiment 1 and a manufacturing method of the liquid crystal device are described with reference to FIGS. 6A and 6B, FIGS. 7A to 7D, and FIG. 8. Note that the liquid crystal device described in this embodiment can be manufactured by a method obtained by omitting part of the manufacturing method described in Embodiment 1. The method described in Embodiment 1 can be appropriately used in this embodiment.

<General Structure Example of Liquid Crystal Device>

Figure 6A:
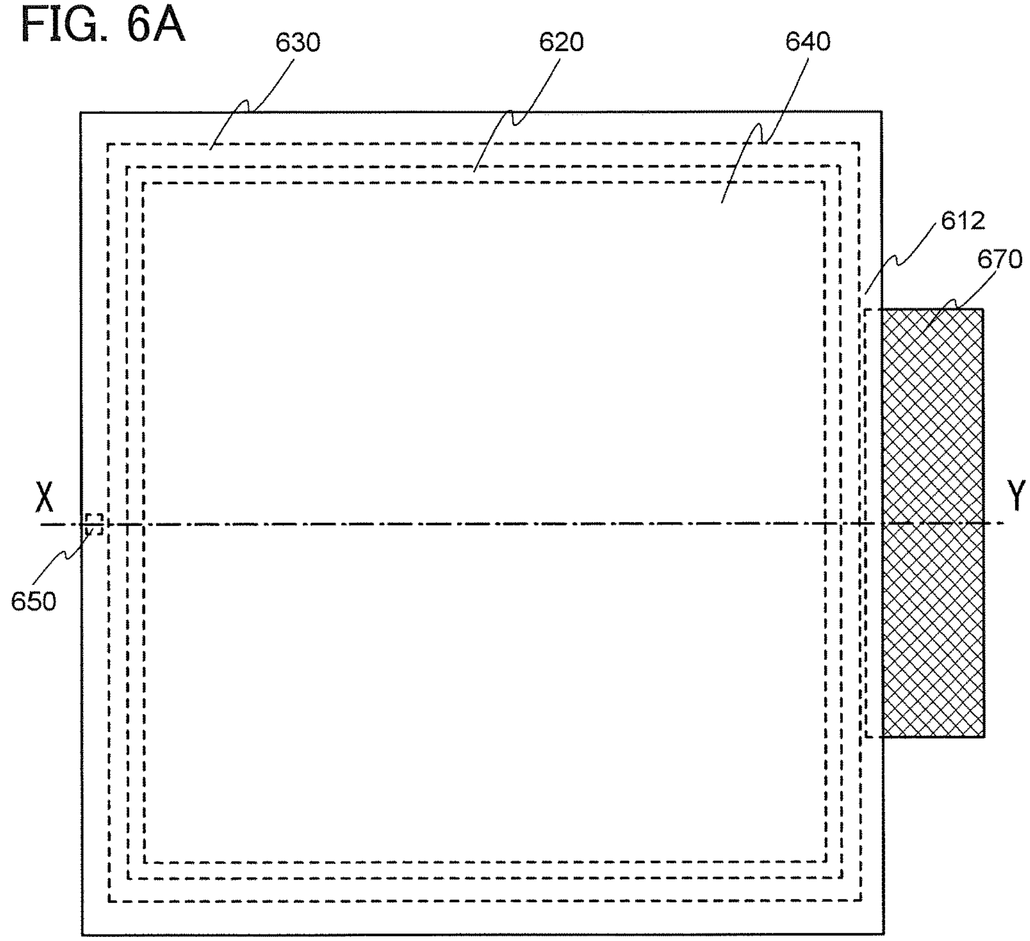
FIGS. 6A and 6B illustrate a top structure and a cross-sectional structure of a liquid crystal device according to an embodiment.
Figure 6B:
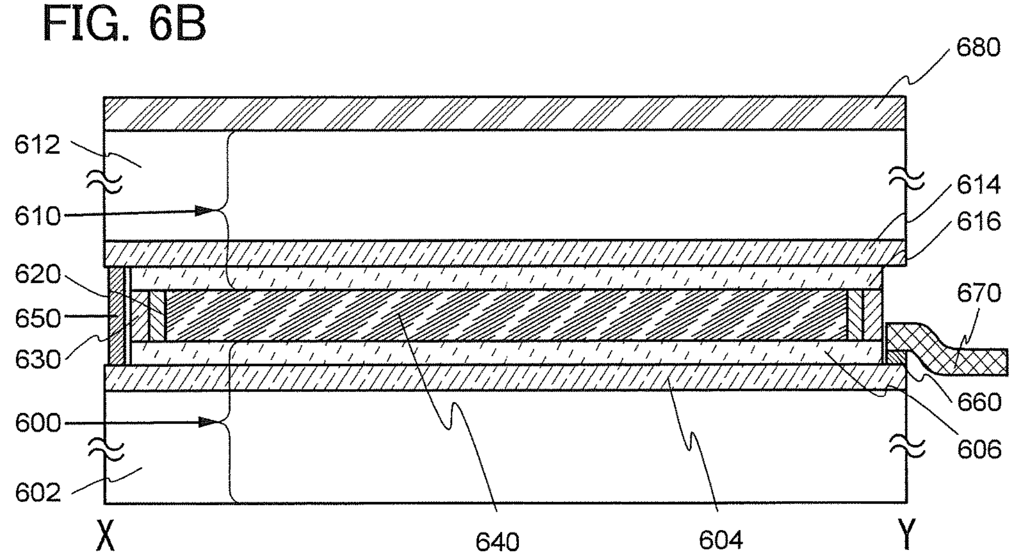

As one example of a structure of a liquid crystal device according to one embodiment of the disclosed invention, a top view of a liquid crystal device in which a liquid crystal material is provided between a base substrate and a counter substrate with the use of a first sealant and a second sealant is shown in FIG. 6A and a cross-sectional view taken along the alternate long and short dashed line of FIG. 6A is shown in FIG. 6B.

A base substrate 600 has a structure in which a first electrode film 604 and a first alignment film 606 are formed in this order on one surface of a first substrate 602. The base substrate 600 is thin, lightweight and is less prone to fracture in the case where force is applied from the outside, for example, an impact is made or bending is made.

Further, the base substrate 600 is not necessarily provided with the element layer 104 which is provided in the base substrate 100 described in Embodiment 1. Thus, the manufacturing process and the transfer process for the element layer 104 are not necessary. Therefore, the base substrate 600 can be manufactured at low cost and in a short time.

A counter substrate 610 has a structure in which a second electrode film 614 and a second alignment film 616 are formed in this order on one surface of a second substrate 612. The counter substrate 610 is thin, lightweight and is less prone to fracture in the case where force is applied from the outside, for example, an impact is made or bending is made. Further, the counter substrate 610 is provided with a polarizing plate 680.

A first sealant 620 contains liquid crystal contaminants at less than or equal to $1\times10^{-4}$ wt % and is formed so as to surround a liquid crystal material 640 seamlessly. Accordingly, a second sealant 630 is not in direct contact with the liquid crystal material 640; thus, liquid crystal contaminants contained in the second sealant 630 can be prevented from being mixed into the liquid crystal material 640.

The second sealant 630 is formed so as to surround the first sealant 620 seamlessly, and the base substrate 600 and the counter substrate 610 are bonded to each other with the use of the first sealant 620 and the second sealant 630 with a bond strength of greater than or equal to 1 [N/mm$^2$]. Thus, the base substrate 600 and the counter substrate 610 can be strongly bonded to each other such that the base substrate 600 is not separated from the counter substrate 610 even in the case where force is applied to the liquid crystal device from the outside.

The first conductive material 650 is provided so as to electrically connect part of the first electrode film 604 and part of the second electrode film 614. Accordingly, voltage can be applied to the second electrode film 614 from the first electrode film 604 through the first conductive material 650, whereby voltage is applied to the liquid crystal material 640 which is provided between the base substrate 600 and the counter substrate 610 and alignment of the liquid crystal material 640 can be adjusted.

Further, an external connection terminal 670 is electrically connected to part of the first electrode film 604 formed on a surface of the first substrate 602 through a second conductive material 660, and has a function of supplying electric power required for operation of the liquid crystal device to the first electrode film 604 through the second conductive material 660 from the outside.

Having the above-described structure, an inexpensive liquid crystal device, which is thin, lightweight and is less prone to fracture even in the case where force is applied from the outside, for example, an impact is made or bending is made, can be provided. In the liquid crystal device, two substrates having high toughness with a liquid crystal material provided therebetween are not easily separated even in the case where strong force is applied from the outside, contamination of a liquid crystal material due to liquid crystal contaminants is suppressed, and alignment of the liquid crystal material can be adjusted in a given way.

<Manufacturing Method of Liquid Crystal Device>

Next, one example of a method for manufacturing the liquid crystal device is described with reference to FIGS. 7A to 7D and FIG. 8. Note that the manufacturing steps of the liquid crystal device according to this embodiment can be broadly categorized into three steps of "a manufacturing process of a base substrate", "a manufacturing process of a counter substrate", and "a sealing process of a liquid crystal"; however, description of the same treatment as that in Embodiment 1 is appropriately omitted.

<Manufacturing Process of Base Substrate>

First, the first electrode film 604 is formed on one surface of the first substrate 602, and a first temporary fixing substrate 624 is bonded to the other surface of the first substrate 602 with a slightly adhesive material 622 provided therebetween. Next, a first alignment film 606 is formed on the first electrode film 604 and rubbing treatment is performed on the first alignment film 606. Thus, the base substrate 600 in which the first electrode film 604 and the first alignment film 606 are formed in this order over the one surface of the first substrate 602 is completed (see FIG. 7A).

Note that the material for forming the first substrate 602 can be the same as that for forming the first substrate 102 in Embodiment 1; the material and the method for forming the first electrode film 604 can be the same as those for forming the first electrode film 114 in Embodiment 1; the material for forming the slightly adhesive material 622 can be the same as that for forming the slightly adhesive material 212 in Embodiment 1; the material for forming the first temporary fixing substrate 624 can be the same as that for forming the first temporary fixing substrate 214 in Embodiment 1; and the material and the method for forming the first alignment film 606 can be the same as those for forming the first alignment film 106 in Embodiment 1. Further, Embodiment 1 is referred to for the detail of the member to be used and the content of processing in the rubbing treatment, and the content of cleaning in manufacturing the base substrate, and the like.

<Manufacturing Method of Counter Substrate>

Next, the second electrode film 614 is formed on one surface of the second substrate 612, and a second temporary fixing substrate 634 is bonded to the other surface of the second substrate 612 with a slightly adhesive material 632 provided therebetween. Next, a second alignment film 616 is formed over the second electrode film 614 and rubbing treatment is performed on the second alignment film 616. Thus, the counter substrate 610 in which the second electrode film 614 and the second alignment film 616 are formed in this order over the one surface of the second substrate 612 is completed (see FIG. 7B).

Note that the material for forming the first substrate 612 can be the same as that for forming the second substrate 112 in Embodiment 1; the material and the method for forming the second electrode film 614 can be the same as those for forming the first electrode film 114 in Embodiment 1; the material for forming the slightly adhesive material 632 can be the same as that for forming the slightly adhesive material 212 in Embodiment 1; the material for forming the second temporary fixing substrate 634 can be the same as that for forming the second temporary fixing substrate 216 in Embodiment 1; and the material and the method for forming the second alignment film 616 can be the same as those for forming the second alignment film 116 in Embodiment 1. Further, Embodiment 1 is referred to for the detail of the member to be used and the content of processing in the rubbing treatment, and the content of cleaning in manufacturing the base substrate, and the like.

Note that the base substrate manufacturing process is followed by the counter substrate manufacturing process in this embodiment; however, the manufacturing order is not limited to this. The base substrate manufacturing process may be performed after the counter substrate manufacturing process, or both the processes may be performed at the same time. The base substrate manufacturing process and the counter substrate manufacturing process are preferably performed at the same time to reduce manufacturing time of a liquid crystal device.

Note that a color filter is not provided in this embodiment; however, a color filter may be provided between the first substrate 602 and the first electrode film 604 or between the second substrate 612 and the second electrode film 614.

<Sealing Process of Liquid Crystal>

Figure 7A:
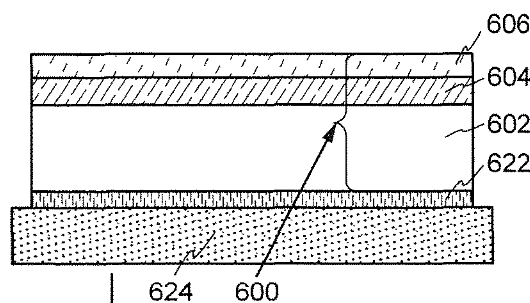
FIGS. 7A to 7D illustrate steps of manufacturing a liquid crystal device according to an embodiment.
Figure 7B:
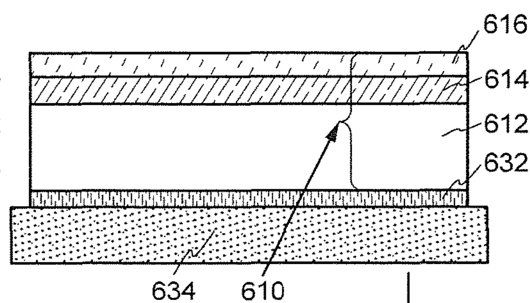
Figure 7C:
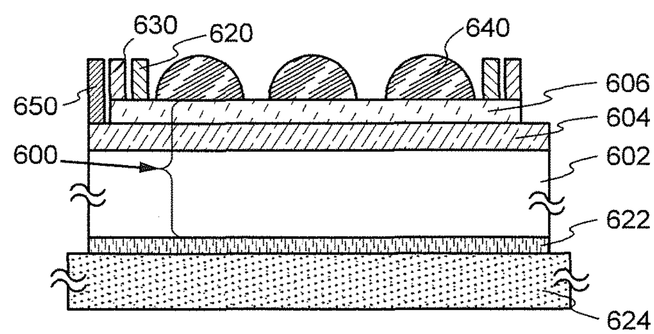
Figure 7D:
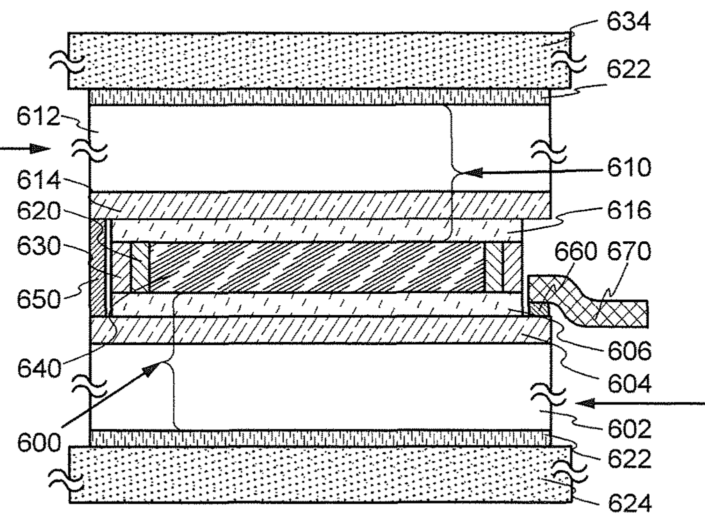

Next, the first sealant 620, the second sealant 630, the liquid crystal material 640, and the first conductive material 650 are provided over the base substrate 600 to which the first temporary fixing substrate 624 is bonded with slightly adhesive material 622 (see FIG. 7C).

Note that the requisite characteristics and the formation method of the first sealant 620 can be the same as those of the first sealant 620 in Embodiment 1; the requisite characteristics and the formation method of the second sealant 630 can be the same as those of the second sealant 130 in Embodiment 1; the material and the characteristics of the liquid crystal material 640 can be the same as those of the liquid crystal material 140 in Embodiment 1; and the material and the formation method of the first conductive material 650 can be the same as those of the first conductive material 150 in Embodiment 1.

Then, the surface of the counter substrate 610, on which the second alignment film 616 is formed, is bonded to a surface of the base substrate 600, on which the liquid crystal material 640 is formed. At the same time, cure treatment is performed on the first sealant 620, the second sealant 630, and the first conductive material 650. Next, the external connection terminal 670 is provided over the part of the first electrode film 604 in the base substrate 600 with the second conductive material 660 provided therebetween and connection process is performed, whereby part of the first electrode film 604 is electrically connected to the external connection terminal 670 (see FIG. 7D).

Note that the material for forming the second conductive material 660 can be the same as that for forming the second conductive material 160 in Embodiment 1. Further, Embodiment 1 is referred to for the details of the contents of the bonding treatment and cure treatment, adhesive force of the sealant to the base substrate and the counter substrate, and the content of the connection process.

Further, as in Embodiment 1, the third sealant may exist so as to surround the second sealant 630.

Figure 8:
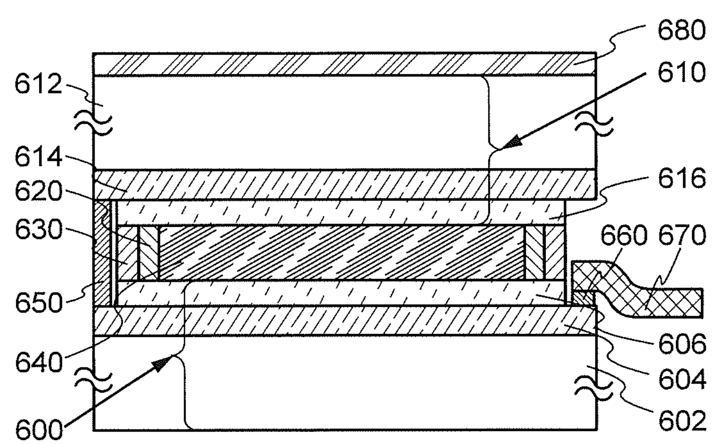
FIG. 8 illustrates a device for manufacturing a liquid crystal device according to an embodiment.

Next, after the slightly adhesive material 622 and the first temporary fixing substrate 624 are separated from the base substrate 600 and the slightly adhesive material 622 and the second temporary fixing substrate 634 are separated from the counter substrate 610, the polarizing plate 680 is bonded to the second substrate 612 (see FIG. 8).

Note that the polarizing plate 680 is provided only on the second substrate 612 side because description is made on a reflective liquid crystal device in this embodiment; however, a polarizing plate may be also provided on the first substrate 602 side in the case of a transmissive liquid crystal device.

Through the above steps, a liquid crystal device capable of adjusting light transmittance at low cost, which is thin, lightweight and is less prone to fracture even in the case where force is applied from the outside, for example, an impact is made or bending is made, can be provided. In the liquid crystal device, two substrates having high toughness with a liquid crystal material provided therebetween are not easily separated even in the case where strong force is applied from the outside, and contamination of a liquid crystal material due to liquid crystal contaminants is suppressed.

Note that a backlight is not provided because description is made on a reflective liquid crystal device in this embodiment; however, a backlight may be provided on the base substrate 600 side in the case of a transmissive liquid crystal device.

According to one embodiment of the present invention, a liquid crystal device is manufactured while the first temporary fixing substrate 624 is bonded to the base substrate 600 with the slightly adhesive material 622 provided therebetween, and the second temporary fixing substrate 634 is bonded to the counter substrate 610 with the slightly adhesive material 622 provided therebetween; thus, deformation or fracture of the base substrate 600 and the counter substrate 610 due to force applied in manufacturing the device can be suppressed.

Further, in the liquid crystal device of this embodiment, it is not necessary to form the element layer over the first substrate 602. Therefore, the process which is necessary to form the element layer can be omitted, and processing cost and processing time can be suppressed.

Thus, an inexpensive liquid crystal device capable of adjusting light transmittance of glass by adjusting alignment state of liquid crystal materials can be provided with high yield.

Embodiment 3

In this embodiment, as one example of a successive formation apparatus, a successive formation apparatus for manufacturing the liquid crystal device having the structure described in Embodiment 1 is described. The structure and the manufacturing steps of the successive formation apparatus are described with reference to FIGS. 9A and 9B, FIGS. 10A and 10B, and FIG. 11. The successive formation apparatus is separately described with three mechanisms of "a base substrate manufacturing mechanism", "a counter substrate manufacturing mechanism", and "a liquid crystal sealing mechanism".

<Base Substrate Manufacturing Apparatus>

Figure 9A:
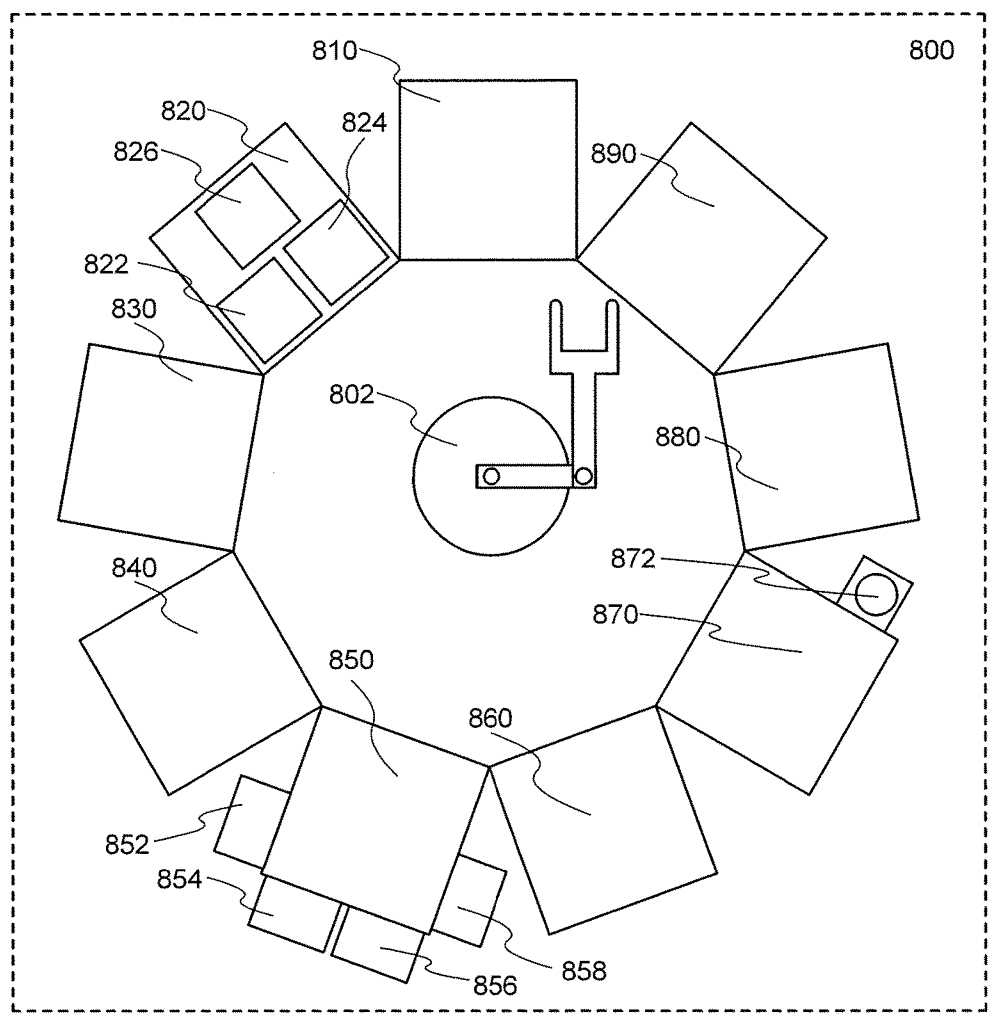
FIGS. 9A and 9B illustrate an apparatus for manufacturing a liquid crystal device according to an embodiment.
Figure 9B:
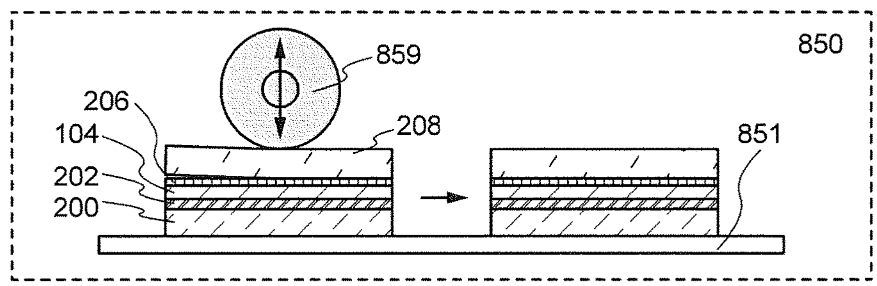

FIGS. 9A and 9B show an example of a structure of a base substrate manufacturing apparatus. A base substrate manufacturing apparatus 800 includes a transfer mechanism 802, a substrate installation chamber 810, a cleaning apparatus 820, a spin coater 830, a UV treatment chamber 840, a bonding apparatus 850, a transfer apparatus 860, a heating apparatus 870, a screen printing machine 880, and a rubbing apparatus 890. The cleaning apparatus 820 includes a first wet cleaning mechanism 822 provided with shower cleaning mechanism, a second wet cleaning mechanism 824 provided with a fluid-jet cleaning mechanism and an ultrasonic cleaning mechanism, and a dry cleaning mechanism 826 provided with a UV ozone cleaning mechanism. The bonding apparatus 850 includes a cassette 852 in which a temporary support substrate 208 is set, a cassette 854 in which the slightly adhesive material 212 is set, a cassette 856 in which the temporary fixing substrate 214 is set, and a cassette 858 in which the first substrate 102 is set. The heating apparatus 870 is provided with a decompression treatment apparatus 872. Further, the spin coater 830 can be provided with both the adhesive 206 for separation and the fixing adhesive 210 (see FIG. 9A).

First, the substrate 200 over which the separation layer 202 and the element layer 104 are formed is installed in the substrate installation chamber 810. A plurality of the substrates 200 is set in a detachable substrate storage cassette and is set in the substrate installation chamber 810 by the cassette. Note that as the separation layer 202 in this embodiment, a stacked structure of metal and metal oxide among the components described in Embodiment 1 is used. Accordingly, the element layer can be transferred by application of physical separating force (e.g., force with which the element layer 104 is separated from the substrate 200).

Next, the substrate 200 set in the substrate installation chamber 810 is transferred to the cleaning apparatus 820 using the transfer mechanism 802 and cleaned using the second wet cleaning mechanism 824. Note that cleaning using the dry cleaning mechanism 826 may be performed after wet cleaning, whereby and the substrate 200 may be further cleaned.

Then, the substrate 200 cleaned using the second wet cleaning mechanism 824 is transferred to the spin coater 830 using the transfer mechanism 802 and is provided with the adhesive 206 for separation. Note that as the adhesive 206 for separation, an adhesive which is soluble in water (hereinafter referred to as a water-soluble adhesive), which is a material described in Embodiment 1, is used here. Note that there are many kinds of water-soluble adhesives such as a thermosetting curable adhesive and a light (UV)-curable adhesive; however, description is made on the case where a UV-curable type water-soluble adhesive is used.

Next, the substrate 200 provided with the adhesive 206 for separation is transferred to the UV treatment chamber 840 using the transfer mechanism 802. The adhesive 206 for separation is cured by UV irradiation.

The substrate 200 provided with the cured adhesive 206 for separation is transferred to the bonding apparatus 850 using the transfer mechanism 802, and the temporary support substrate 208 is bonded to the substrate 200. Note that the bonding apparatus 850, as shown in FIG. 9B, has a moving mechanism 851 and one or more bonding jigs 859 (e.g., a roller) which move up and down and adjust the distance between the moving mechanism 851 and the bonding jig in a given way. Using the bonding jig 859, the bonding apparatus 850 performs bonding treatment on an object placed over the moving mechanism 851. FIG. 9B shows a state where the temporary support substrate 208 is bonded over the adhesive 206 for separation. Here, as the temporary support substrate 208, a UV peeling tape, which is a material described in Embodiment 1, is used.

Next, the substrate 200 to which the temporary support substrate 208 is bonded is transferred to the transfer chamber 860 using the transfer mechanism 802, and the element layer 104 is transferred to the temporary support substrate 208 side by the technique described in Embodiment 1.

The temporary support substrate 208 provided with the element layer 104 is transferred to the spin coater 830 using the transfer mechanism 802 and then is provided with the fixing adhesive 210. Note that description is made on the case where a UV-curable type adhesive, which is a material illustrated in Embodiment 1, is used as the fixing adhesive 210.

Next, the temporary support substrate 208 provided with the fixing adhesive 210 is transferred to the bonding apparatus 850 using the transfer mechanism 802, and the first substrate 102 is bonded to the fixing adhesive 210.

Next, the first substrate 102 to which the temporary support substrate 208 is bonded is transferred to the UV treatment chamber 840 using the transfer mechanism 802. UV irradiation is performed on the fixing adhesive 210, whereby the temporary support substrate 208 and the first substrate 102 are bonded to each other with the fixing adhesive 210 provided therebetween.

Next, the first substrate 102 to which the temporary support substrate 208 is bonded is transferred to the bonding apparatus 850 using the transfer mechanism 802, and the first temporary fixing substrate 214 is bonded to the first substrate 102 with the slightly adhesive material 212 provided therebetween.

Next, the first substrate 102 to which the temporary support substrate 208 and the first temporary fixing substrate 214 are bonded is transferred to the transfer chamber 860 using the transfer mechanism 802, and the temporary support substrate 208 is separated along the adhesive 206 for separation. Further, the first substrate 102 is transferred to the cleaning apparatus 820, and the adhesive 206 for separation is removed using the first wet cleaning mechanism 822. Accordingly, the element layer 104 is transferred to the first substrate 102 side with the fixing adhesive 210 provided therebetween.

Next, the first substrate 102 provided with the element layer 104 is transferred to the cleaning apparatus 820 using the transfer mechanism 802 and cleaned using the dry cleaning mechanism 826. Here, cleaning using the second wet cleaning mechanism 824 may be performed at the same time. In the case where cleaning using the second wet cleaning mechanism 824 is performed, heat treatment using the heating apparatus 870 or heat treatment under reduced pressure using the decompression treatment apparatus is performed, whereby moisture attaching to the substrate can be effectively removed.

Next, the first substrate 102, which has subjected to the cleaning treatment, is transferred to the screen printing machine 880 using the transfer mechanism 802, and the first alignment film 106 is formed. Note that polyimide described in Embodiment 1 is used as the first alignment film 106.

Next, the first substrate 102 provided with the first alignment film 106 is transferred to the rubbing apparatus 890 using the transfer mechanism 802, and the first alignment film 106 is subjected to rubbing treatment.

The first substrate 102 which is subjected to the rubbing treatment is stored in the substrate storage cassette of the substrate installation chamber 810 using the transfer mechanism 802.

Through the above manufacturing steps, the base substrate 100 to which the first temporary fixing substrate 214 is bonded with the slightly adhesive material 212 provided therebetween is completed.

Note that in the counter substrate manufacturing apparatus in this embodiment, processing units are arranged around the transfer mechanism 802; however, the present invention is not limited thereto. For example, processing units may be arranged in a line, in an L shape, or the like, considering workability and a space for installation of the apparatus.

<Counter Substrate Manufacturing Apparatus>

Figure 10A:
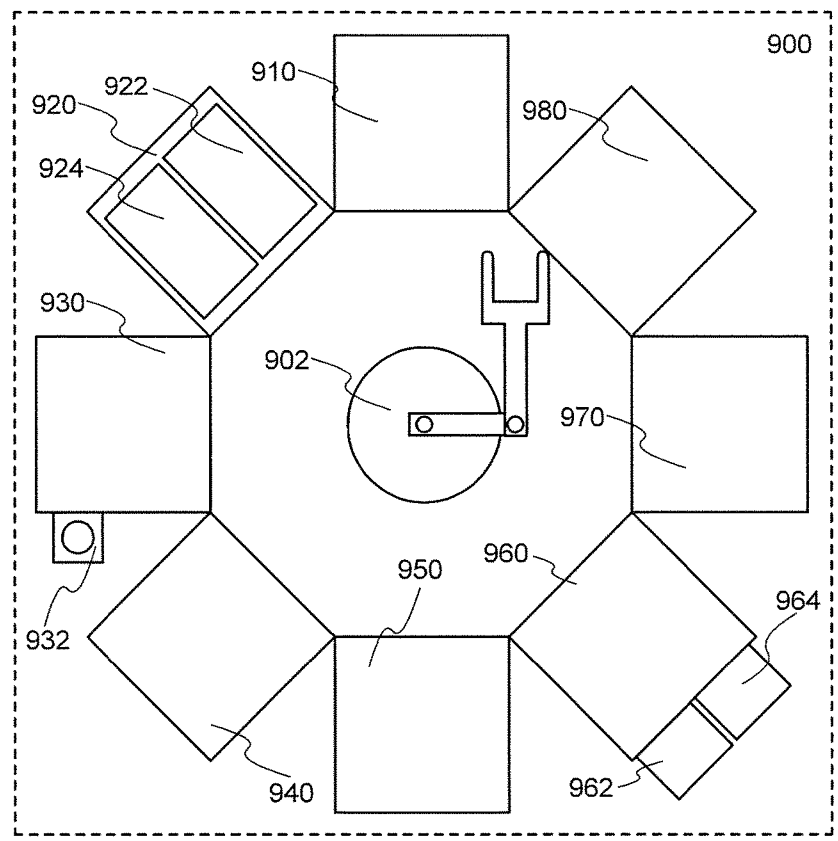
FIGS. 10A and 10B illustrate an apparatus for manufacturing a liquid crystal device according to an embodiment.
Figure 10B:
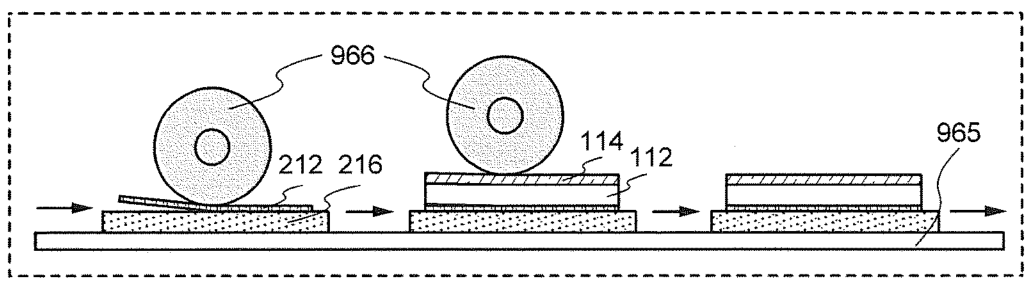

FIGS. 10A and 10B show an example of a structure of a counter substrate manufacturing apparatus. A counter substrate manufacturing apparatus 900 includes a transfer mechanism 902, a substrate installation chamber 910, a cleaning apparatus 920, a heating apparatus 930, a spin coater 940, a sputtering apparatus 950, a bonding apparatus 960, a screen printing machine 970, and a rubbing apparatus 980. The cleaning apparatus 920 includes a wet cleaning mechanism 922 provided with a fluid-jet cleaning mechanism and an ultrasonic cleaning mechanism, and a dry cleaning mechanism 924 provided with a UV ozone cleaning mechanism. The heating apparatus 930 is provided with a decompression treatment apparatus 932, and the bonding apparatus 960 is provided with a cassette 962 in which the slightly adhesive material 212 is set and a cassette 964 in which the second temporary fixing substrate 216 is set (see FIG. 10A).

First, the second substrate 112 is installed in the substrate installation chamber 910. A plurality of the second substrate 112 is set in a detachable substrate storage cassette and is set in the substrate installation chamber 910 by the cassette.

Next, the second substrate 112 which is set in the substrate installation chamber 910 is transferred to the cleaning apparatus 920 using the transfer mechanism 902 and is cleaned using one or both of the wet cleaning mechanism 922 and the dry cleaning mechanism 924.

The second substrate 112 cleaned in the cleaning apparatus 920 is transferred to the spin coater 940 using the transfer mechanism 902, and a protective film is formed. Here, an acrylic resin, which is a material illustrated in Embodiment 1, is used as the protective film.

Next, the second substrate 112 over which the protective film is formed is transferred to the heating apparatus 930 using the transfer mechanism 902 and is subjected to heat treatment, whereby the protective film is cured. After the cure treatment, the heating apparatus 930 is set in a state of reduced pressure using the decompression treatment apparatus 932 and the second substrate is further subjected to heat treatment. Thus, the moisture attaching to the second substrate 112 and the protective film can be removed.

Next, the second substrate 112 over which the protective film is formed is transferred to the sputtering apparatus 950 using the transfer mechanism 902, and the electrode film 114 is formed. Here, the ITO film described in Embodiment 1 is used as the electrode film 114.

Next, the second substrate 112 over which the electrode film 114 is formed is transferred to the bonding apparatus 960 using the transfer mechanism 902, and the second temporary fixing substrate 216 is bonded to the second substrate 112 with the slightly adhesive material 212 provided therebetween. Note that the bonding apparatus 960, as shown in FIG. 10B, has a moving mechanism 965 and one or more bonding jigs 966 (e.g., a roller) which move up and down and adjust the distance between the moving mechanism 965 and the bonding apparatus 960 in a given way. The bonding apparatus 960 performs bonding treatment on an object installed over the moving mechanism 965 using the bonding jig 966. FIG. 10B shows a state where the second substrate 112 is bonded to the slightly adhesive material 212 after the slightly adhesive material 212 is bonded over the second temporary fixing substrate 216.

The second substrate 112 to which the second temporary fixing substrate 216 is bonded with the slightly adhesive material 212 provided therebetween is transferred to the screen printing machine 970 using the transfer mechanism 902, and the second alignment film 116 is formed over the electrode film 114. Here, polyimide, which is described in Embodiment 1, is used as the second alignment film 116.

Next, the second substrate 112 over which the second alignment film 116 is provided is transferred to the rubbing apparatus 980 using the transfer mechanism 902 and the second alignment film 116 is subjected to rubbing treatment.

Next, the second substrate 112 which is subjected to the rubbing treatment is installed in the substrate storage cassette in the substrate installation chamber 910 using the transfer mechanism 902.

Through the above manufacturing steps, the counter substrate 110 to which the second temporary fixing substrate 216 is bonded with the slightly adhesive material 212 provided therebetween is completed.

Note that in the counter substrate manufacturing apparatus, processing units are arranged around the transfer mechanism 902; however, the present invention is not limited thereto. For example, processing units may be arranged in a line, in an L shape, or the like, considering workability and a space for installation.

<Liquid Crystal Sealing Apparatus>

Figure 11:
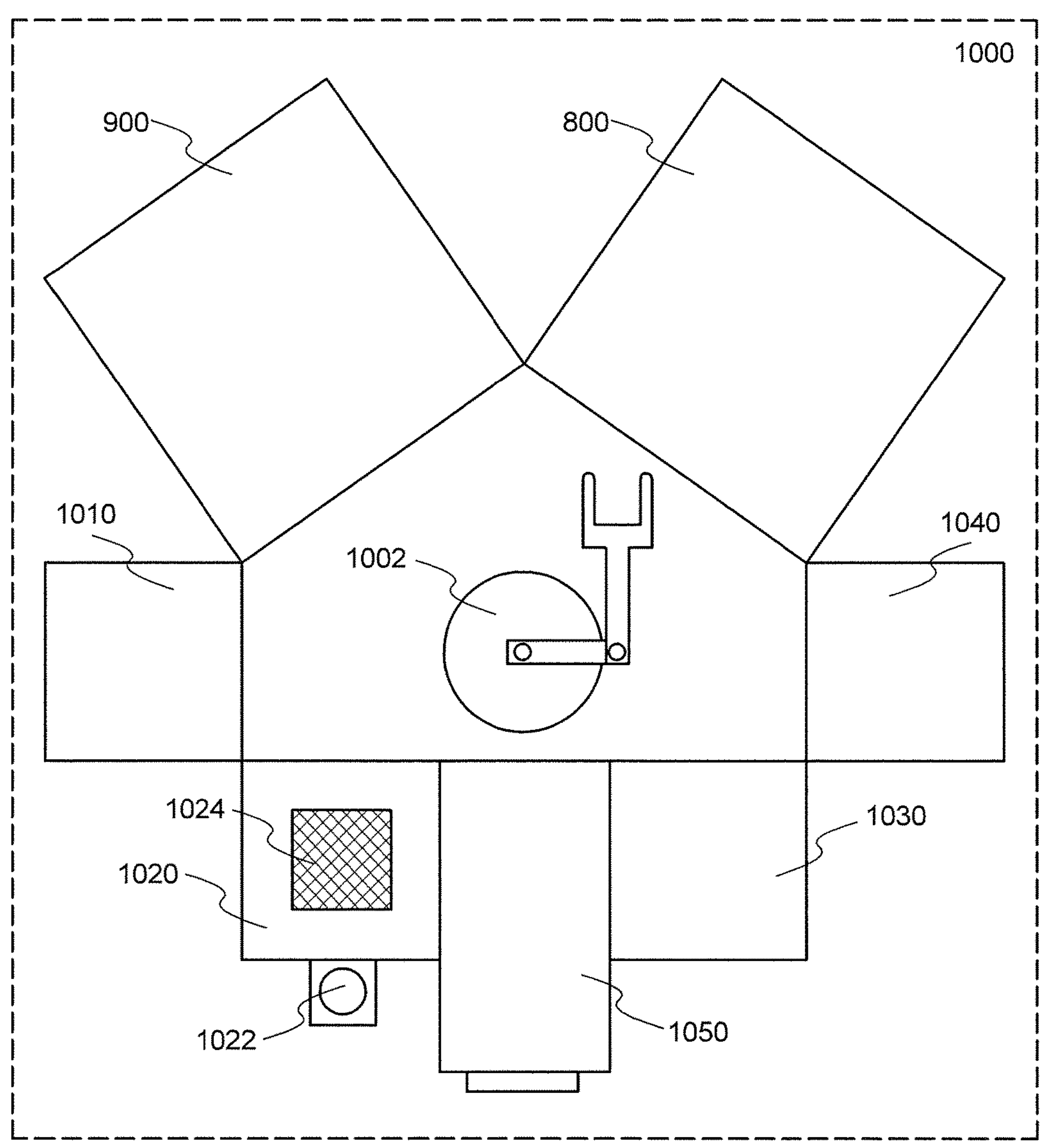
FIG. 11 illustrates an apparatus for manufacturing a liquid crystal device according to an embodiment.

FIG. 11 shows an example of a structure of a liquid crystal sealing apparatus. The liquid crystal sealing apparatus 1000 includes a transfer mechanism 1002, the base substrate manufacturing apparatus 800, the counter substrate manufacturing apparatus 900, a dispenser 1010, a bonding apparatus 1020, an external connection terminal pressure bonding apparatus 1030, and a separation apparatus 1040. Note that the dispenser 1010 has a mechanism capable of selecting any of the first sealant 120, the second sealant 130, the liquid crystal material 140, the first conductive material 150, and the second conductive material 160 to be used in a switching process. A mode in which one dispenser is assigned to each material may be employed. Further, the bonding apparatus 1020 is provided with a decompression treatment apparatus 1022, and a UV irradiation apparatus 1024.

First, the base substrate 100 to which the first temporary fixing substrate 214 is bonded with the slightly adhesive material 212 provided therebetween is transferred from the substrate installation chamber 810 in the base substrate manufacturing apparatus 800 to the dispenser 1010 using the transfer mechanism 1002, and is provided with the first sealant 120, the second sealant 130, the liquid crystal material 140, and the first conductive material 150. Note that a photo-radical curable adhesive, which is described in Embodiment 1, is used as the first sealant 120, a photo-cationic curable adhesive is used as the second sealant 130, a high molecular liquid crystal is used as the liquid crystal material 140, and a UV photo-curable epoxy resin in which Ag particles are dispersed is used as the first conductive material 150.

Note that the third sealant may exist so as to surround the second sealant 130 seamlessly as in Embodiment 1.

Next, the base substrate over which the materials are provided is transferred to the bonding apparatus 1020 using the transfer mechanism 1002 and is installed in the bonding apparatus 1020. Further, the counter substrate 110 to which the second temporary fixing substrate 216 is bonded with the slightly adhesive material 212 provided therebetween is transferred from the counter substrate manufacturing apparatus 900, and bonding treatment is performed in the bonding apparatus 1020 in which a reduced pressure state is maintained by the decompression treatment apparatus 1022. Then, cure treatment is performed on the first sealant 120, the second sealant 130, and the first conductive material 150 by the UV irradiation apparatus 1024. Thus, the base substrate 100 and the counter substrate 110 are bonded strongly to each other using the first sealant 120 and the second sealant 130. The part of the element layer 104 and the part of the electrode film 114 are electrically connected to each other through the first conductive material 150.

Next, the base substrate 100 and the counter substrate 110 which are bonded to each other using the sealant is transferred to the external connection terminal pressure bonding apparatus 1030 by the transfer mechanism 1002, and part of the element layer 104 is connected to the external connection terminal 170 with the second conductive material 160 provided therebetween. Here, a conductive particle in which an organic resin particle is coated with a nickel thin film and a silver thin film in this order, which is described in Embodiment 1, is used as the second conductive material, and a flexible printed circuit (FPC), which is described in Embodiment 1, is used as the external connection terminal 170.

The substrate provided with the external connection terminal 170 with the second conductive material 160 provided therebetween is transferred to the separation apparatus 1040 using the transfer mechanism 1002. The slightly adhesive material 212 and the first temporary fixing substrate 214 are separated from the base substrate 100, and the slightly adhesive material 212 and the second temporary fixing substrate 216 are separated from the counter substrate 110.

Lastly, the liquid crystal device manufactured through the above steps is transferred to a chamber 1050 for taking out the substrate using the transfer mechanism 1002 and is stored.

Through the above steps, the liquid crystal device capable of adjusting the alignment of the liquid crystal material in a given way, in which the liquid crystal material 140 is sandwiched between the base substrate 100 and the counter substrate 110 using the first sealant 120 and the second sealant 130, is completed.

In the liquid crystal sealing apparatus of this embodiment, processing units are arranged around the transfer mechanism 1002; however, the present invention is not limited thereto. For example, processing units may be arranged in a line, in an L shape, or the like, considering workability and a space for installation.

As described above, by successively performing manufacturing steps of the liquid crystal device, mixture of dust and impurities into the liquid crystal device can be suppressed. Further, because the substrates are transferred using the transfer mechanism, defects such as fracture of a liquid crystal device in transferring the substrate can be suppressed. Further, in this embodiment, since a multichamber type apparatus in which the base substrate manufacturing apparatus, the counter substrate manufacturing apparatus and the liquid crystal sealing apparatus are placed around the transfer mechanism, is used, a plurality of substrates can be processed at the same time, and manufacturing time of the liquid crystal device can be drastically shortened.

Thus, the liquid crystal device can be manufactured with a high yield in a short time.

This application is based on Japanese Patent Application serial no. 2010-182078 filed with Japan Patent Office on Aug. 17, 2010, the entire contents of which are hereby incorporated by reference.

What is claimed is:

1. A method for manufacturing a liquid crystal device, comprising:

forming an element layer over a top surface of a first substrate;

providing a first temporary fixing substrate on a bottom surface of the first substrate with a slightly adhesive material provided therebetween;

forming a first alignment film on the element layer;

forming a base substrate to which the first temporary fixing substrate is bonded by performing first alignment treatment on the first alignment film;

forming an electrode film on a top surface of a second substrate, providing a second temporary fixing substrate on a bottom surface of the second substrate with a slightly adhesive material provided therebetween;

forming a second alignment film on the electrode film;

forming a counter substrate to which the second temporary fixing substrate is bonded by performing second alignment treatment on the second alignment film;

providing, over the base substrate, a first sealant;

a liquid crystal material surrounded by the first sealant;

a second sealant surrounding the first sealant; and a first conductive material over the element layer, bonding a surface where the second alignment film in the counter substrate is formed to a surface where the first alignment film in the base substrate is formed under reduced pressure;

performing cure treatment on the first sealant, the second sealant, and the first conductive material;

bonding the base substrate and the counter substrate using the first sealant, and the second sealant;

connecting a part of the element layer and a part of the electrode film electrically using the first conductive material;

separating the slightly adhesive material and the first temporary fixing substrate from the base substrate, and separating the slightly adhesive material and the second temporary fixing substrate from the counter substrate, wherein an external connection terminal is connected to a part of the element layer with a second conductive material interposed therebetween.

2. A method for manufacturing a liquid crystal device comprising:

forming an element layer over a top surface of a first substrate whose value of fracture toughness is greater than or equal to 1.5 [$MPa \cdot m^{1/2}$];

forming a base substrate by providing a first temporary fixing substrate on a bottom surface of the first substrate with a slightly adhesive material provided therebetween;

forming an electrode film on a top surface of a second substrate whose value of fracture toughness is greater than or equal to 1.5 [$MPa \cdot m^{1/2}$];

forming a counter substrate by providing a second temporary fixing substrate on a bottom surface of the second substrate with a slightly adhesive material interposed therebetween; and providing, over the base substrate, a first sealant;

a liquid crystal material surrounded by the first sealant;

a second sealant surrounding the first sealant; and a first conductive material over the element layer, bonding a surface where the electrode film in the counter substrate is formed to a surface where the element layer in the base substrate is formed under reduced pressure;

performing cure treatment on the first sealant, the second sealant, and the first conductive material;

bonding the base substrate and the counter substrate using the first sealant, and the second sealant;

connecting a part of the element layer and a part of the electrode film electrically using the first conductive material;

separating the slightly adhesive material and the first temporary fixing substrate from the base substrate, and separating the slightly adhesive material and the second temporary fixing substrate from the counter substrate, wherein an external connection terminal is connected to part of the element layer through a second conductive material.

3. A method for manufacturing a liquid crystal device comprising:

forming a first electrode film on a top surface of a first substrate whose value of fracture toughness is greater than or equal to 1.5 [$MPa \cdot m^{1/2}$];

providing a first temporary fixing substrate over a bottom surface of the first substrate with a slightly adhesive material interposed therebetween;

forming a first alignment film over the first electrode film;

forming a base substrate to which the first temporary fixing substrate is bonded by performing first alignment treatment on the first alignment film;

forming a second electrode film on a top surface of a second substrate whose value of fracture toughness is greater than or equal to 1.5 [$MPa \cdot m^{1/2}$];

providing a second temporary fixing substrate over a bottom surface of the second substrate with a slightly adhesive material interposed therebetween;

forming a second alignment film over the second electrode film;

forming a counter substrate to which the second temporary fixing substrate is bonded by performing second alignment treatment on the second alignment film;

providing, over the base substrate, a first sealant;

a liquid crystal material surrounded by the first sealant;

a second sealant surrounding the first sealant; and a first conductive material over the element layer, bonding a surface where the second alignment film in the counter substrate is formed to a surface where the first alignment film in the base substrate is formed under reduced pressure;

performing cure treatment on the first sealant, the second sealant, and the first conductive material;

bonding the base substrate and the counter substrate using the first sealant, and the second sealant;

connecting a part of the first electrode film and a part of the second electrode film electrically using the first conductive material;

separating the slightly adhesive material and the first temporary fixing substrate from the base substrate, and separating the slightly adhesive material and the second temporary fixing substrate from the counter substrate, wherein an external connection terminal is connected to a part of the first electrode film or the second electrode film through a second conductive material.

4. The method for manufacturing a liquid crystal device according to claim 1, wherein the first sealant is provided so as to surround the liquid crystal material seamlessly, and wherein the second sealant is provided so as to surround the first sealant seamlessly.

5. The method for manufacturing a liquid crystal device according to claim 2, wherein the first sealant is provided so as to surround the liquid crystal material seamlessly, and wherein the second sealant is provided so as to surround the first sealant seamlessly.

6. The method for manufacturing a liquid crystal device according to claim 3, wherein the first sealant is provided so as to surround the liquid crystal material seamlessly, and wherein the second sealant is provided so as to surround the first sealant seamlessly.

7. The method for manufacturing a liquid crystal device according to claim 1, wherein the base substrate and the counter substrate are bonded to each other with a bond strength of greater than or equal to 1 $N/mm^2$.

8. The method for manufacturing a liquid crystal device according to claim 2, wherein the base substrate and the counter substrate are bonded to each other with a bond strength of greater than or equal to 1 $N/mm^2$.

9. The method for manufacturing a liquid crystal device according to claim 3, wherein the base substrate and the counter substrate are bonded to each other with a bond strength of greater than or equal to 1 $N/mm^2$.

* * * * *